United States Patent
Zou et al.

(10) Patent No.: US 11,109,329 B2
(45) Date of Patent: Aug. 31, 2021

(54) METHODS AND APPARATUS FOR SYNCHRONIZING CRITICAL DATA TRANSMISSION

(71) Applicant: Telefonaktiebolaget LM Ericsson (publ), Stockholm (SE)

(72) Inventors: Zhenhua Zou, Solna (SE); Ali Behravan, Stockholm (SE); Joachim Sachs, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 204 days.

(21) Appl. No.: 16/323,310

(22) PCT Filed: Nov. 6, 2018

(86) PCT No.: PCT/SE2018/051130
§ 371 (c)(1),
(2) Date: Feb. 5, 2019

(87) PCT Pub. No.: WO2019/088911
PCT Pub. Date: May 9, 2019

(65) Prior Publication Data
US 2020/0367182 A1 Nov. 19, 2020

Related U.S. Application Data

(60) Provisional application No. 62/582,193, filed on Nov. 6, 2017.

(51) Int. Cl.
*H04W 56/00* (2009.01)
*H04W 72/04* (2009.01)
(52) U.S. Cl.
CPC ......... *H04W 56/001* (2013.01); *H04W 72/04* (2013.01)

(58) Field of Classification Search
CPC ........................... H04W 56/001; H04W 72/04
See application file for complete search history.

(56) References Cited

U.S. PATENT DOCUMENTS

2017/0019914 A1    1/2017  Rune et al.
2019/0045521 A1*   2/2019  Hong ................. H04W 56/001
(Continued)

FOREIGN PATENT DOCUMENTS

| JP | 2017139662 A | 8/2017 |
| WO | 2015094033 A1 | 6/2015 |
| WO | 2017172479 A1 | 10/2017 |

OTHER PUBLICATIONS

LG Electronics, "Discussion on eNS scheduling enhancement for sidelink resource allocation", 3GPP TSG RAN WG1 Meeting #84bis, Busan, Korea, Apr. 11, 2016, pp. 1-3, R1-162481, 3GPP.
(Continued)

*Primary Examiner* — Brian D Nguyen
(74) *Attorney, Agent, or Firm* — Coats & Bennett, PLLC

(57) ABSTRACT

The present disclosure provides techniques for reducing latency of periodic URLLC transmission and other critical data transmission with low latency requirements. To support periodic URLLC traffic, SPS with repetition is used. Before synchronization is achieved, the base station (300, 500) sends to the UE (400, 600) an SPS configuration for a periodic uplink data transmissions. When the starting time of the data transmission is not known, the base station (300, 600) over-provisions SPS resources for the periodic data transmission. Based on the timing of the data transmissions, the base stations (300, 600) adjusts the timing of the SPS configuration.

18 Claims, 23 Drawing Sheets

(56) References Cited

U.S. PATENT DOCUMENTS

| | | | |
|---|---|---|---|
| 2019/0059115 A1* | 2/2019 | Uchiyama | H04W 72/1263 |
| 2019/0116608 A1* | 4/2019 | Kim | H04W 72/1263 |
| 2020/0195389 A1* | 6/2020 | Basu Mallick | H04W 4/70 |
| 2020/0196120 A1 | 6/2020 | Uchiyama | |
| 2020/0296694 A1* | 9/2020 | Zhao | H04W 72/0413 |
| 2020/0305139 A1* | 9/2020 | Xu | H04W 72/121 |
| 2020/0336268 A1* | 10/2020 | Shi | H04L 5/0048 |

OTHER PUBLICATIONS

ZTE, "SPS enhancements for V2X over Uu", 3GPP TSG RAN WG2 #94, Nanjing, China, May 23, 2016, pp. 1-4, R2-163840, 3GPP.

Ericsson, "RAN2 Techniques for reliability", 3GPP TSG,RAN WG2 #99bis, Prague, Czech Republic, Oct. 9, 2017, pp. 1-4, R2-1710504, 3GPP.

Nokia, "Enhanced semi-persistent scheduling for 5G URLLC", 3GPP TSG-RAN WG1 #87, Reno, US, Nov. 14, 2016, pp. 1-8, R1-1612251, 3GPP.

3rd Generation Partnership Project, "LTE; Evolved Universal Terrestrial Radio Access (E-UTRA); Radio Resource Control (RRC); Protocol specification", Technical Specification, 3GPP TS 36.331 version 14.4.0 Release 14, ETSI TS 136 331 V14.4.0, Oct. 1, 2017, pp. 1-761.

\* cited by examiner

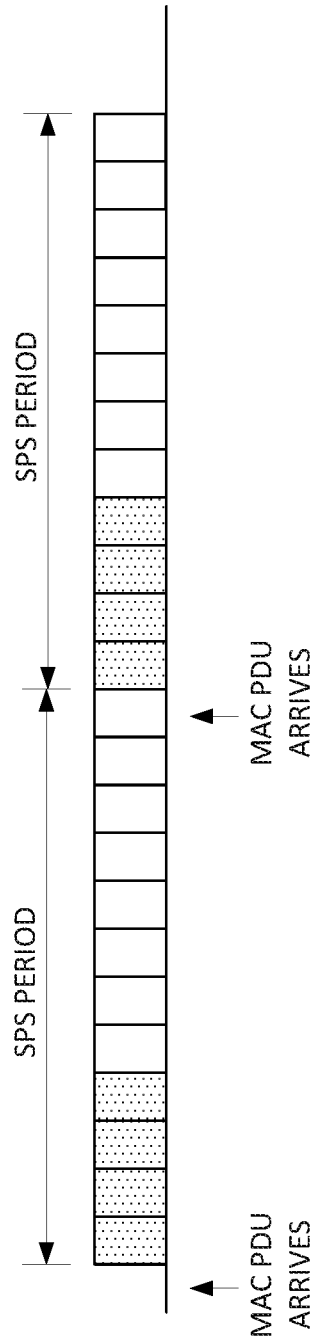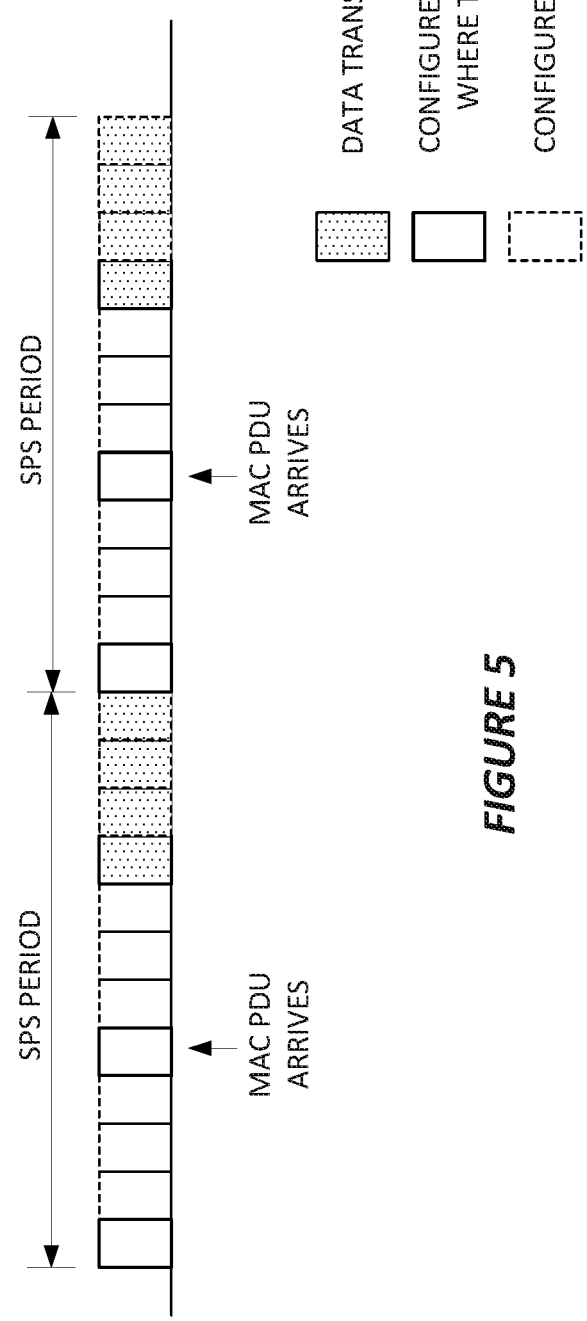

METHODS AND APPARATUS FOR SYNCHRONIZING CRITICAL DATA TRANSMISSION

TECHNICAL FIELD

The present disclosure relates generally to data transmission in wireless communication networks and, more particularly, to semi-persistent scheduling for critical data transmissions.

BACKGROUND

Critical data transmissions require a combined requirement of low latency and high reliability, such as a loss ratio of $10^{-5}$ within 1 millisecond. This feature, denoted Ultra Reliable and Low Latency Communication (URLLC), is a part of the Fifth Generation (5G) requirement by the International Telecommunication Union (ITU) and is under-development in both Long Term Evolution (LTE) Release 15 and Next Radio (NR).

One typical use case for URLLC is closed loop control for factory automation. In factory automation, the traffic is periodically generated at sensors. For example, the sensors may generate data every 5 ms. The data is then sent to the controller with the URLLC requirement of 1 ms latency and $10^{-5}$ loss ratio. After the controller has collected all measurements, actuation commands are sent to the actuator, also with the URLLC data delivery requirement. In this example, a periodic traffic pattern every 5 ms with delivery reliability of $1 \times 10^{-5}$ and a maximum latency of 1 ms is expected for the factory automation use case in URLLC.

In LTE, Semi-persistent Scheduling (SPS) was introduced to support predictable services where similar-sized data packets are generated periodically, such as voice over Internet Protocol (VoIP) service. The base station, also referred to as an Evolved NodeB (eNB) or 5G Node B (gNB), allocates periodically occurring resources to the User Equipment (UE) by a combination of Radio Resource Control (RRC) message and Layer 1 (L1) activation messages. This process helps in reducing the Physical Downlink Control Channel (PDCCH) load, which would otherwise be needed for each allocated Uplink (UL) resources in dynamic scheduling.

SPS was enhanced in LTE Release 14 to support latency reduction of UL data transmissions. Compared to UL dynamic scheduling, SPS can access the UL transmission resources much more quickly because it removes the steps of sending scheduling requests by the UE and responsive UL dynamic grants by the base station.

To further reduce latency, the periodicity is reduced to the minimum value, i.e., one Transmission Time Interval (TTI) in LTE. Prior to Release 14, if the transmit buffer is empty, the UE needs to send padding on the allocated SPS resources. It is more likely that the UE might have empty data with such a low periodicity, and sending padding at every TTI introduces un-necessary interference. Consequently, the option of skipping UL data transmissions when the buffer is empty is introduced. However, the configured resources are still reserved for the UE, and that might lead to inefficient resource utilization.

In NR, this principle of allocating periodic UL transmission resources in SPS is adopted. Some further features are added to support the low latency and high reliability requirements.

One new feature is support of transport block repetitions. There are two main candidate schemes under consideration. The first scheme is that repetition can start at any time. The benefit of this approach is that it reduces latency from the time the packet is ready to the time the packet can be sent, but it needs mechanisms to cover potential error cases of the base station (e.g., eNB/gNB) not detecting the initial transmissions. The second scheme requires that the repetitions can only start at a specific time. The main benefits of this second approach are that it does not need to detect the initial transmission and it simplifies the design of redundant versions in each repetition.

Another new feature is the type-1 UL data transmission without grant, which is only based on RRC (re)configuration without any L1 signaling. SPS corresponds to type 2 UL data transmission without grant, which is based on both RRC configuration and L1 signaling activation/deactivation for UL data transmission without grant.

SPS can be configured in the Downlink (DL) for periodic traffic. The benefits are reduced PDCCH load, which would otherwise be needed for each dynamically scheduled DL assignment. There is, however, not-much discussion on enhancing DL SPS for URLLC periodic traffic.

To support periodic URLLC traffic, SPS with transport block repetition is used. The base station allocates the smallest periodicity to the UE, i.e., the SPS period should match the URLLC period. SPS resources should be allocated when there is data to be sent. This means that alignment of the packet arrival time needs to be aligned with the periodicity of the URLLC traffic and the SPS configuration.

The periodicity and the latency budget of the traffic can be conveyed by QoS Quality of Service (QoS) Class Identifier (QCI) in LTE and the 5G QoS Indicator (5QI) in NR of the data radio bearer or another signaling mechanism. However, the packet arrival time is unknown. A misalignment between the arrival time and the allocated transmission opportunity leads to a waiting time for UL SPS resources for data transmissions. This waiting time adds to the overall packet delay. The overall latency may exceed the ultra-low latency requirement for URLLC or it may leave too short remaining time for the physical layer to reach the ultra-high reliability requirement, which is guaranteed by time-diversity techniques, such as Hybrid Automatic Repeat Request (HARQ)-less repetitions.

For DL URLLC traffic, if the base station initially does not know the packet arrival time (i.e., offset) and does not know in advance how fast it can process the packet due to the unknown amount of data and number of UEs at that moment, there is also a misalignment that may lead to extra waiting time. This misalignment is most relevant for packets in the beginning of a traffic stream. After a certain amount of time, the base station can adjust the configuration.

SUMMARY

The present disclosure provides techniques for reducing latency of periodic URLLC transmission and other critical data transmission with low latency requirements. To support periodic URLLC traffic, SPS with repetition is used. Before synchronization is achieved, the base station sends to the UE an SPS configuration for a periodic UL data transmission. When the starting time of the data transmission is not known, the base station over-provisions SPS resources for the periodic data transmission. For example, the base station may grant the UE all available resources in the SPS for the periodic data transmission. For UL transmissions, the UE skips transmission if its buffer is empty, i.e., there is no data to send. By observing whether there are UL transmissions on the allocated SPS resources and reconfiguring the SPS resources, the base station can recursively derive the correct arrival time of the Medium Access Control (MAC) Packet Data Units (PDUs). In some embodiments, the UE may indicate the starting time of URLLC traffic in an RRC Information Element (IE) sent from the UE to the base station.

A similar approach is used for periodic DL data transmissions. When the starting time of the data transmission is not known, the base station over-provisions SPS resources for the periodic data transmission and adjusts the timing/offsets of the SPS configuration by observing the data transmissions. The UE may be configured to blindly detect the data transmission. In cases where DL padding skipping is not supported, different cyclic shifts in reference signals for padding data and non-padding data are used to enable the UE to distinguish padding data from non-padding data.

One aspect of the disclosure comprises methods implemented by a base station of synchronizing a periodic data transmission where each data transmission of the periodic data transmission comprises a predetermined number of repetitions. The base station sends a first SPS configuration including a SPS period and an offset to a UE for the periodic data transmission and allocates a number of SPS resources for the periodic data transmission exceeding the number of repetitions in each data transmission. The base station further receives a data transmission from the UE or sends a data transmission to the UE in a first SPS period in accordance with the first SPS configuration. Based on timing of the data transmission, the base station determines a new SPS configuration to synchronize the SPS period with the periodic data transmission and sends the new SPS configuration to the UE.

Another embodiment comprises a base station configured to implement the method in the preceding paragraph. In one embodiment, the base station comprises an interface circuit for communicating with a UE and a processing circuit. The processing circuit is configured to send a first SPS configuration including a SPS period and an offset to a UE for the periodic data transmission, allocate a number of SPS resources for the periodic data transmission exceeding the number of repetitions in each data transmission, receive a data transmission from or send a data transmission to the UE in a first SPS period, determine a new SPS configuration based on a timing of the data transmission to synchronize the SPS period with the periodic data transmission, and send the new SPS configuration to the UE.

Another aspect of the disclosure comprises computer programs containing instructions that when executed by a processing circuit in a base station, cause the base station to perform the method described above. The computer programs may be embodied in a carrier or stored in a non-transitory computer readable medium.

Another aspect of the disclosure comprises methods performed by a UE. In one embodiment, the UE receives an SPS configuration for the periodic data transmission from the base station. The SPS configuration includes an SPS period and an offset. The UE receives, from the base station, an allocation of available SPS resources in said SPS period for the periodic data transmission where the number of SPS resources allocated for the periodic data transmission exceeds the number of repetitions in each data transmission. The UE then receives data transmission from or sends a data transmission to the base station 300 on allocated SPS resources according to the SPS configuration.

Another aspect of the disclosure comprises a UE configured to implement the method in the preceding paragraph. In one embodiment, the UE comprises an interface circuit for communicating with a UE and a processing circuit. The processing circuit is configured to receive, from the base station, an SPS configuration for the periodic data transmission from the base station and an allocation of available SPS resources in said SPS period for the periodic data transmission where the number of SPS resources allocated for the periodic data transmission exceeds the number of repetitions in each data transmission. The processing circuit is further configured to receive a data transmission from or send a data transmission to the base station on allocated SPS resources according to the SPS configuration.

Other aspects of the disclosure comprise computer programs containing instructions that when executed by a processing circuit in a UE, cause the UE to perform the method described above. The computer programs may be embodied in a carrier or stored in a non-transitory computer readable medium.

BRIEF DESCRIPTION OF THE DRAWINGS

FIG. 4 illustrates alignment of the SPS period with the MAC PDU arrival time.

FIG. 5 illustrates over-provisioning of SPS resources where the data transmission is constrained to begin at certain specified time periods.

DETAILED DESCRIPTION

Figure 1:
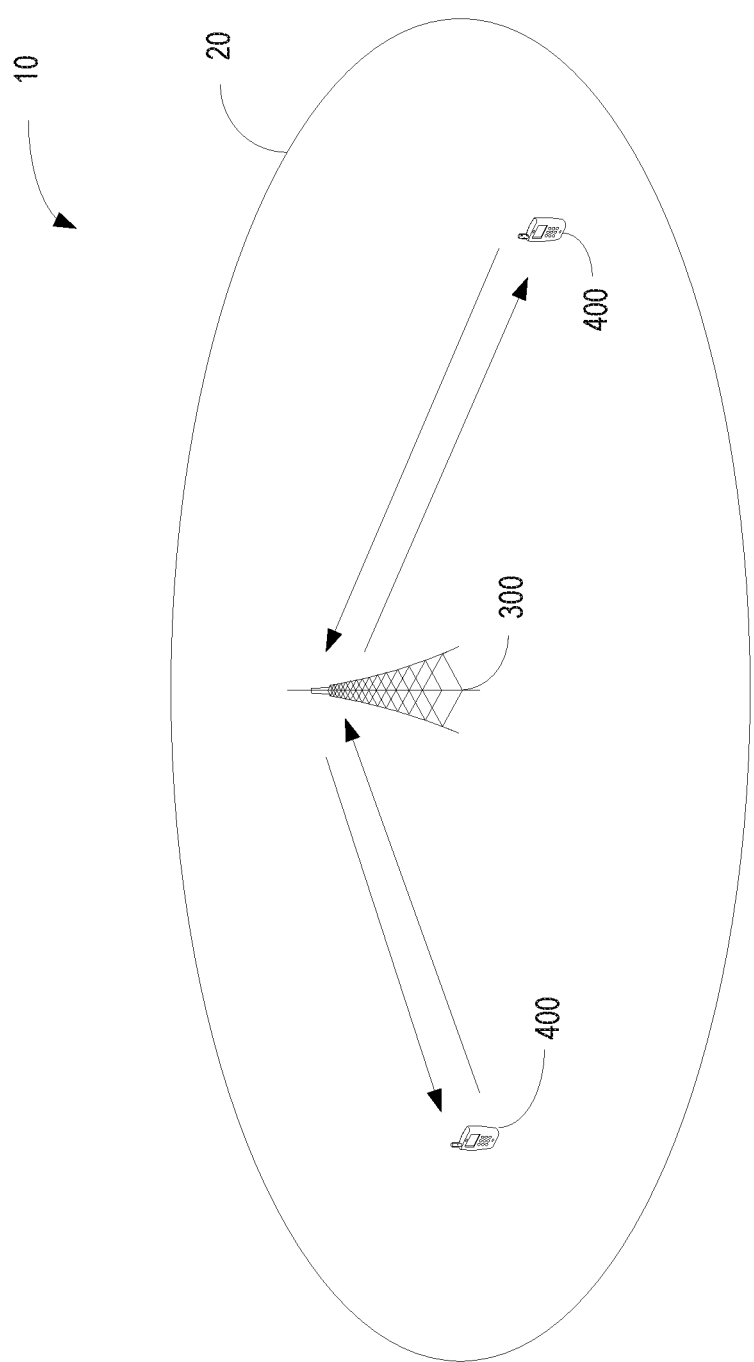
FIG. 1 illustrates a wireless communication network supporting URLLC traffic.

Referring now to the drawings, an exemplary embodiment of the present disclosure will be described in the context of LTE based systems configured for URLLC using SPS with repetition. The techniques described allow the periodicity and starting time of URLLC traffic to be aligned with the allocated SPS resources so that the latency for an UL/DL transmission is minimized. Two approaches, one without 3$^{rd}$ Generation Partnership Project (3GPP) standardization impact and one with 3GPP standardization impacts, are presented.

In the following description, the term SPS is used to refer to both SPS in LTE and UL transmission without grant currently under discussion in NR. Those skilled in the art will appreciate that the techniques described herein are more generally applicable to any wireless communication network in which SPS is used. The techniques herein described can be easily adapted by those skilled in the art for use in communication networks based on other Radio Access Technologies (RATs) such as Wideband Code Division Multiple Access (WCDMA) networks, Wireless Fidelity (WiFi) networks, Worldwide Interoperability for Microwave Access (WiMAX) networks, Wireless Local Area Networks (WLANs), 5G networks, NR networks, or other wireless communication networks using SPS.

FIG. 1 illustrates an exemplary wireless communication network 10 configured to support URLLC transmissions. The wireless communication network 10 comprises one or more base stations 300 providing radio coverage in respective cells 20 of the wireless communication network 10. While only one base station 300 and one cell 20 are shown, it will be appreciated that a typical network 10 would comprise many cells 20 and base stations 300.

The wireless communication network 10 further comprises a plurality of user terminals 400, which are also known as UEs. The UEs 400 may comprise, for example, cellular telephones, smart phones, laptop computers, notebooks, tablets, Machine-Type Communication (MTC) devices, Machine-to-Machine (M2M) communication devices, or other wireless devices capable of communicating over a wireless communication channel with the base station 300 or small base stations 300. While two UEs 400, are shown in FIG. 1, it will be appreciated that the cell 20 may provide service to any number of UEs 400.

In LTE networks, dynamic scheduling is typically used to schedule data transmissions between the base station 300 and the UEs 400. When a UE 400 has data to send, it transmits a scheduling request to the base station 300 and waits for an UL grant from the base station 300. On the DL, the base station 300 schedules the UEs 400 to receive a data transmission on the Physical Downlink Shared Channel (PDSCH) when it has data to send and transmits scheduling information to the UEs 400 on the PDCCH to indicate which UE 400 has been scheduled. The UEs 400 monitor the PDCCH to determine whether it is scheduled to receive data.

One drawback to dynamic scheduling is the signaling overhead to schedule data transmissions.

In LTE, SPS was introduced to support predictable services where similar-sized data packets are generated periodically, such as VoIP service. SPS will be used in 5G and NR networks. With SPS, the base station 300 allocates periodically occurring resources to the UE 400 by a combination of RRC messages and L1 activation messages. This process helps in reducing the PDCCH load, which would otherwise be needed for dynamic scheduling and resource allocation.

In exemplary embodiments of the present disclosure, SPS is used along with Transport Block (TB) repetition without HARQ to meet the stringent latency requirements for URLLC in the 5G and NR standards. It is assumed that the base station 300 knows the periodicity of the URLLC transmissions, referred to herein as the URLLC period, and the latency budget for the URLLC transmissions. The periodicity and the latency budget of the URLLC traffic can be conveyed by the QCI (for LTE) or the 5QI (in NR) of the data radio bearer, or another signaling mechanism.

The base station 300 configures SPS with the same periodicity, i.e., the SPS period matches the URLLC period. SPS resources for each SPS period should then be allocated when there is data to be sent. Generally, the smallest amount of resources should be allocated so that resources are not wasted.

Figure 2:
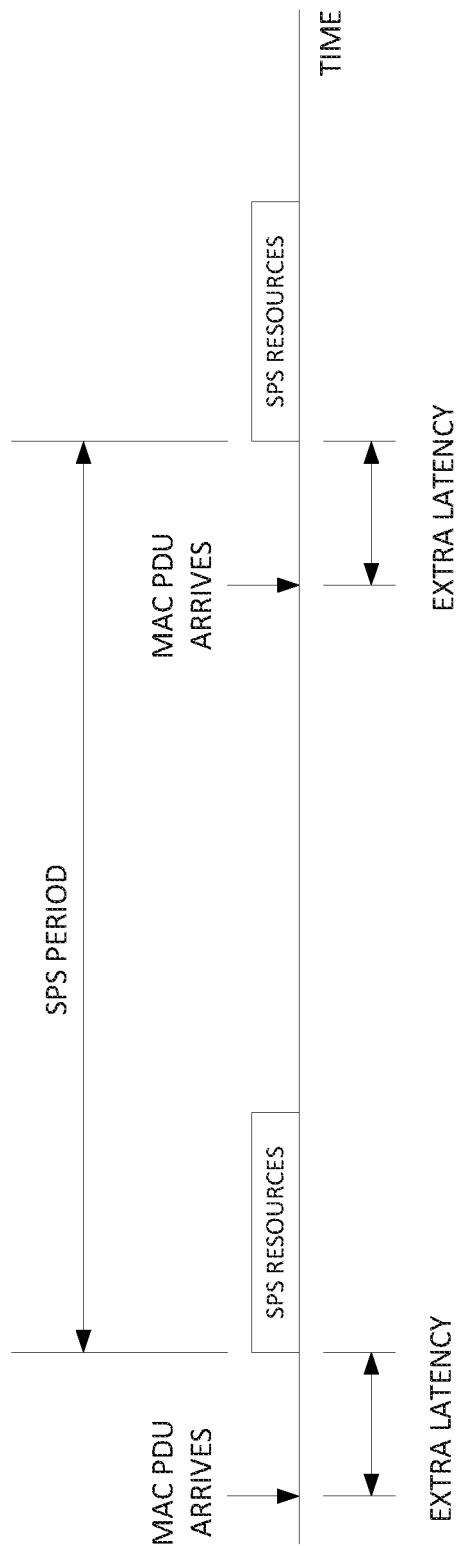
FIG. 2 illustrates excess latency due to misalignment of the SPS period with respect to the MAC PDU arrival time.

To minimize latency, the SPS period needs to be aligned with the packet arrival time of the MAC PDUs. However, the packet arrival time is unknown. A misalignment between the packet arrival time and the allocated transmission opportunity leads to a waiting time for UL SPS resources for data transmissions as shown in FIG. 2. This waiting time adds to the overall packet delay, which may exceed the ultra-low latency requirement for URLLC. Also, where the packet arrival time occurs late in the SPS period, there may not be sufficient time for the physical layer to reach the ultra-high reliability requirement, which is guaranteed by time-diversity techniques, such as HARQ-less repetitions.

For DL URLLC traffic, if the base station 300 initially does not know the packet arrival time (i.e., offset) and does not know in advance how fast it can process the packet due to the unknown amount of data and number of UEs 400 at that moment, there may also be a misalignment that may lead to extra waiting time. This misalignment problem is most concerning at the beginning of a traffic stream. After a certain amount of time, the base station 300 can adjust the configuration.

In exemplary embodiments described below, techniques are described for synchronizing the SPS period with the packet data arrival time for the URLLC transmissions to reduce the waiting time and minimize latency of periodic URLLC transmissions. These techniques can be applied to both UL and DL transmissions. For both UL and DL transmissions, repetition of the transport block is used. This feature is equivalent to retransmission without waiting for HARQ feedback. The goal is to have more transmissions within the latency budget to obtain a lower overall block error rate (BLER). The base station 300 configures the UE 400 to repeat the UL transmission of a single TB according to the configured repetition rules. For UL transmissions from the UE 400 to the base station 300, the UE 400 is further configured to skip transmissions when the transmit buffer is empty, i.e., there is no data to send. This means that if the data buffer is empty, the UE 400 does not utilize the configured SPS resources.

First Embodiment

Uplink Transmission Starts at any Time

Figure 3A:
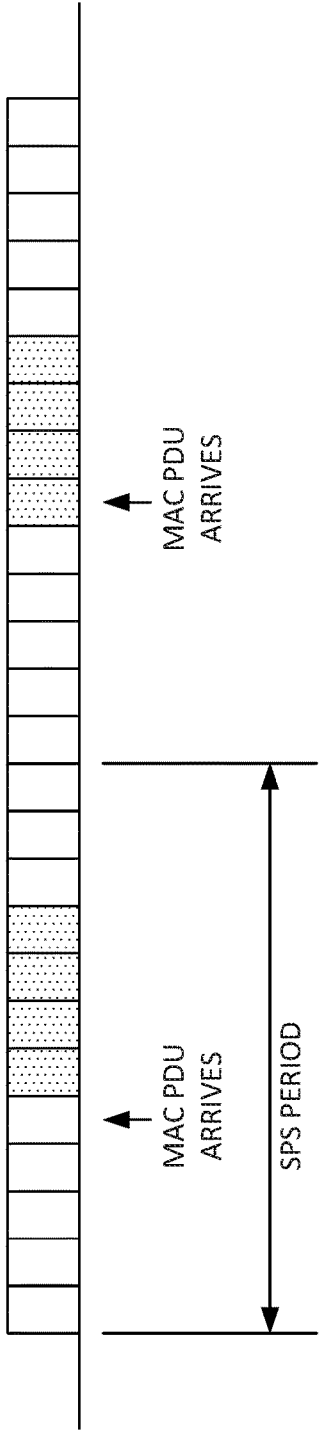
FIGS. 3A and 3B illustrate over-provisioning of SPS resources where the data transmission can start at any time.
Figure 3B:
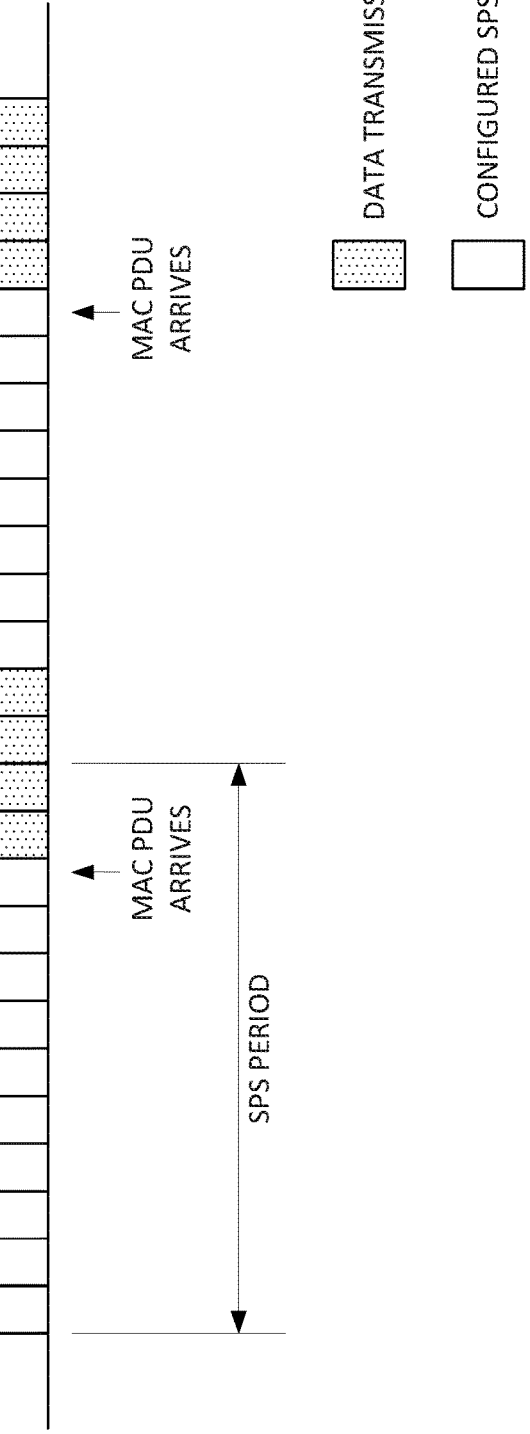

With reference to FIGS. 3A, 3B and 4, an example of the synchronization technique for UL transmissions is described. It is assumed in this example that the base station 300 does not know the packet arrival time for the periodic data transmission and that the data transmission can start at any time. In this case, the base station 300 derives the periodicity and latency budget of the URLLC traffic from the 5QI/QCI or some other signaling mechanisms, such as management interfaces in a local private network. In the example shown in FIGS. 3A, 3B and 4, the URLLC period is 12. The base station 300 determines an SPS configuration whose periodicity is equal to the periodicity of URLLC traffic. The SPS configuration includes the SPS period, offset, number of repetitions, and resource allocation. In some embodiments, the SPS configuration optionally includes a repetition period of the SPS resources. When the packet arrival start time is not known, i.e. before synchronization of the SPS period is achieved, the base station 300 can allocate all SPS resources within the SPS period for the periodic data transmission from the UE 400 and configure UE 400 to repeat the transport block N times, where N is determined from the latency budget and/or reliability target of URLLC traffic. After receiving the SPS configuration, UE 400 starts transmitting the transport block only if it has data in the buffer, and transmits the transport block according to the repetition rules. The data transmission can start at any configured SPS resource and the repetition can extend to the next period.

FIGS. 3A and 3B show two examples of an initial SPS configuration where the number of repetitions equals 4 (including the initial transmission of the transport block). In both examples, the packet data arrival time is not known. In FIG. 3A, there are 12 transmission intervals in the SPS period and the data packets arrive in the $5^{th}$ transmission interval. In this case, the data transmission is wholly contained in a single SPS period. In FIG. 3B, there are 12 transmission intervals in the SPS period, the number of repetitions equals 4 (including the initial transmission) and the data packets arrive in the 11th transmission interval so that the data transmission extends into the next SPS period.

In both scenarios shown in FIGS. 3A and 3B, the base station 300 can successfully detect the starting time of the data transmission and determine a new SPS configuration as shown in FIG. 4. The new SPS configuration includes an adjusted offset that aligns the start of the SPS period as closely as possible to the packet data arrival time. The base station 300 can also reduce the resource allocation to four SPS resources covering exactly the location where the four UL transmissions appear as shown in FIG. 4.

In some embodiments, the base station 300 can be configured to detect pseudo-periodic traffic. One example of pseudo-periodic traffic is when the start time of the data transmission is the same from one period to the next, but the number of repetitions varies slightly, e.g., by 1. The base station 300 can be configured to detect slight variation from one period to the next. For example, assume that the base station 300 detects that UL transmissions appear in time where the first repetition occurs at time n+i and the last repetition occurs at time n+j. If the number of configured repetition plus the initial transmission is N, and j−i+1>N, the uplink transmission is not periodic and may be pseudo-periodic. In this case, the base station 300 can allocate SPS resources to cover all the time instances from n+i to n+j. In other words, the resource allocation for the SPS configuration is enough to cover the longest data transmission.

Although the number of repetitions is typically greater then 1, the techniques described above can be applied when N=1 to reduce latency in cases where starting-time alignment for periodic traffic is needed.

Second Embodiment

Uplink Transmission Starts at Specified Times

In some scenarios, the staring time for the UL data transmission is not known to the base station 300, but is constrained to begin at specified times in the SPS period. FIG. 5 illustrates one example where the starting time for the UL data transmission is constrained. SPS resources where a data transmission can begin are shown in solid lines. SPS resources shown in dotted lines represent configured SPS resources in which data transmission is not allowed to start. In this example, the number of repetitions equals 4 and the SPS period comprises 12 transmission intervals. The UL data transmission is constrained to begin at time intervals 1, 5, and 9. The MAC PDU arrives at time 5 and the UE 400 has to wait until time interval 9 to start the UL data transmission.

Figure 6:
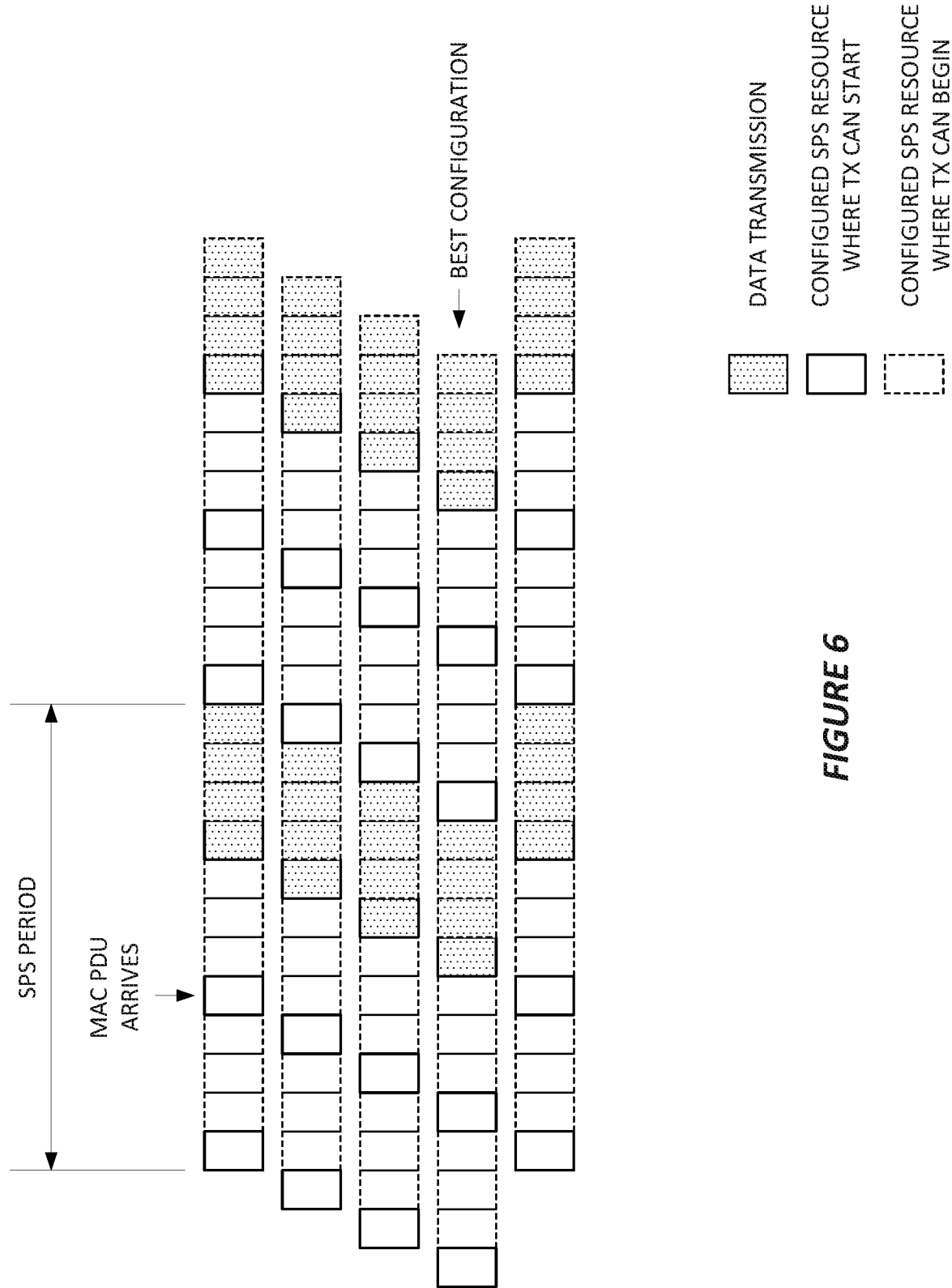
FIGS. 6 and 7 illustrate an exemplary method of determining the SPS configuration to synchronize with the periodic data transmission.

In this case, the base station 300 can generate N candidate SPS configurations with different offsets, i.e., different starting times as shown in FIG. 6. In this example, each candidate SPS configuration is shifted left one by one. The base station 300 configures the UE 400 to transmit using each SPS configuration beginning with the first SPS configuration. After each data transmission, the base station 300 determines the actual time to complete the UL transmission and re-configures the UE 400 with the next candidate SPS configuration. In this example, the data transmission is completed at time interval 12 for the first UL transmission and at time interval 11 for the second SPS configuration. The base station 300 continues to cycle through the candidate SPS configurations until it detects an increase in the transmission time as shown in FIG. 6. When the base station 300 detects an increase in the actual transmission time, it selects the previous SPS configuration as the optimal configuration for latency reduction.

Figure 7:
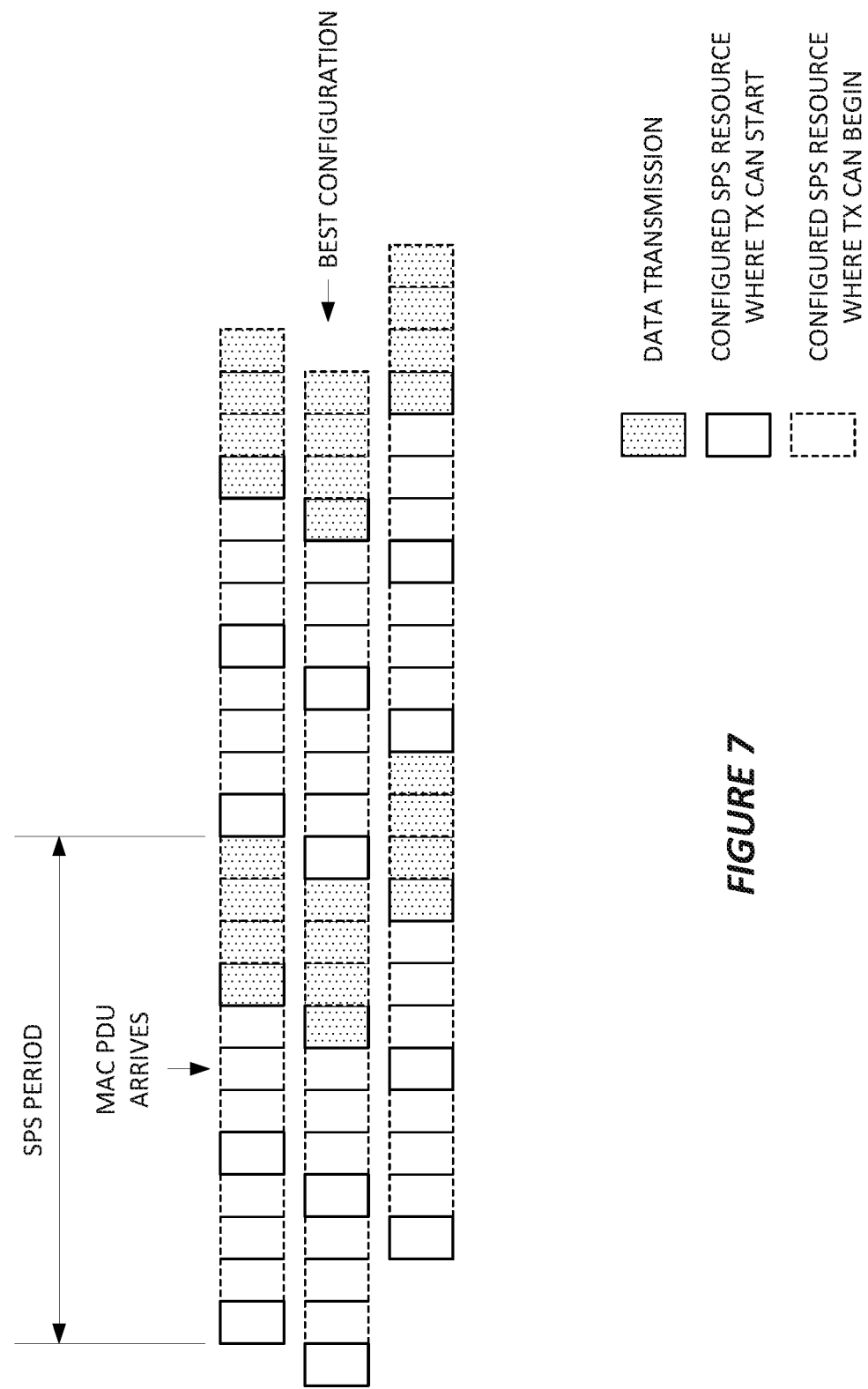

In the example shown in FIG. 6, all N=4 configurations need to be searched before the optimal SPS configuration was found. However, it is not allows necessary to search all 4 candidate SPS configurations. FIG. 7 illustrates another example where the optimal SPS configuration is found after two re-configurations of the SPS.

FIGS. 6 and 7 illustrate one procedure to find the SPS configuration with the optimal alignment for latency reduction. There can be other procedures to find this alignment with different optimal criterions, for example, with the target that maximum number of re-configurations is minimal or the average number of re-configurations is minimal. The re-configuration does not need to shift left one-by-one.

Third Embodiment

UE Based SPS Configuration for UL Transmission

In some embodiments, the UE 400 can provide assistance information to the base station 300 for determining the SPS configuration. For example, the UEAssistanceInformation message specified in in the Third Generation Partnership Project (3GPP) standard TS 36.331, § 5.6.10, Release 15 may be used to send assistance information to the base station 300. In some embodiments of the present disclosure, a new information element (IE) referred to as the startingTime IE is defined to indicate the exact packet arrival timing for a periodic URLLC transmission. The startingTime IE indicates the timing offset of the packet data arrival with respect to an absolute time (e.g., subframe #0 of SFN #0) in number of Orthogonal Frequency Division Multiplexing (OFDM) symbols and subcarrier spacing (NR only). The base station 300 can use the timing information to determine the SPS configuration. The same triggering condition for UEAssistanceInformation specified in TS 36.331 can be used. Upon receipt of the startingTime IE, the base station 300 determines the optimal SPS configuration based on the packet arrival time specified in the startingTime IE.

The startingTime IE as herein described differs from the timingOffset IE introduced in LTE Release 14 as part of the "sps-AssistanceInformation-r14" for V2X services. The main differences are:
1. The timingOffset IE only indicates an estimate timing for a packet arrival, whereas the startingTime IE indicates an accurate timing for a packet arrival.
2. timingOffset IE only indicates the timing offset in number of milliseconds. This is not sufficient for URLLC service, which has sub-millisecond alignment requirement. Note that sub-milliseconds are feasible for LTE short-TTI (2/3 OFDM symbols or 7 OFDM symbols), NR mini-slot (e.g., 1 OFDM symbol to 13 OFDM symbols) and can also be even smaller with higher subcarrier spacing like 30 kHz, 60 kHz. Hence, the startingTime IE indicates both number of OFDM symbols and subcarrier spacing.
3. timingOffset IE is tied with the "multipleUplinkSPS" configuration, which means if "multipleUplinkSPS" is not supported at the UE 400, it cannot report SPS assistance information. The startingTime IE can be used for one SPS configuration.
4. timingOffset IE is tied with V2X service, and cannot indicate that the traffic is for URLLC traffic. The startingTime IE is only used for indicating URLLC traffic.

Fourth Embodiment

UE Assisted SPS Configuration for UL Transmission

In another embodiment, UE 400 does not know the accurate packet arrival timing, but only an estimated value. The UE 400 sends this estimate of the packet arrival time, which is another form of assistance information, to the base station 300. The base station 300 can use the estimated packet arrival time to reduce its search space in the scenarios where the data transmission can begin at any time. In this case, the allocated SPS resources do not need to cover all time instances within one SPS period, but rather the regions surrounding the estimated arrival time.

Fifth Embodiment

Downlink Transmissions

The techniques herein described can also be used for SPS configuration for periodic data transmissions to the UE 400. For DL SPS, the base station 300 may not know the packet arrival time (i.e., offset) and not know in advance how fast it can process the packet due to a high number of UEs 400, and/or a large amount of traffic in the buffer. The techniques described above can be applied to periodic downlink transmissions to reduce the alignment latency for the packets in the beginning of a traffic stream.

In some embodiments, DL padding skipping may be supported where the base station 300 refrains from transmitting on the DL when there is no data to send, i.e. no padding transmissions. If DL padding skipping is supported, then the procedure is the same as in UL. In this case, the techniques described in the First Embodiment can be applied to the DL and the UE 400 is configured to blindly detect the starting of the transmission. The base station 300 adjusts the SPS configuration by observing its own transmission.

If DL padding skipping is not supported, the base station 300 is configured to use two different cyclic shifts in Demodulation Reference Signals (DMRS) allocated respectively for padding data and non-padding data. The UE 400 is thus able to distinguish padding data and non-padding data based on the cyclic shift to blindly detect the DL transmissions. If UE 400 decodes a transport block that has an allocated cyclic shift for padding data, it clears the buffer. The techniques described in the First Embodiment can then be applied to the downlink and the UE 400 can blindly detect the downlink transmissions. The base station 300 adjusts the SPS configuration by observing its own transmission.

Sixth Embodiment

Iterative Methods of Uplink and Downlink Transmissions

This embodiment deals with the scenario that the network 10 is loaded and an SPS allocation in every transmission interval, as assumed in the previous sections, is not feasible. Instead of allocating SPS resources in every transmission interval in an SPS period as previously described, the base station 300 allocates SPS resources for every X transmission intervals where X>1 and X depends on the network load. This creates a situation similar to Embodiment 2 where the data transmission is constrained to start at specified time intervals.

Figure 8:
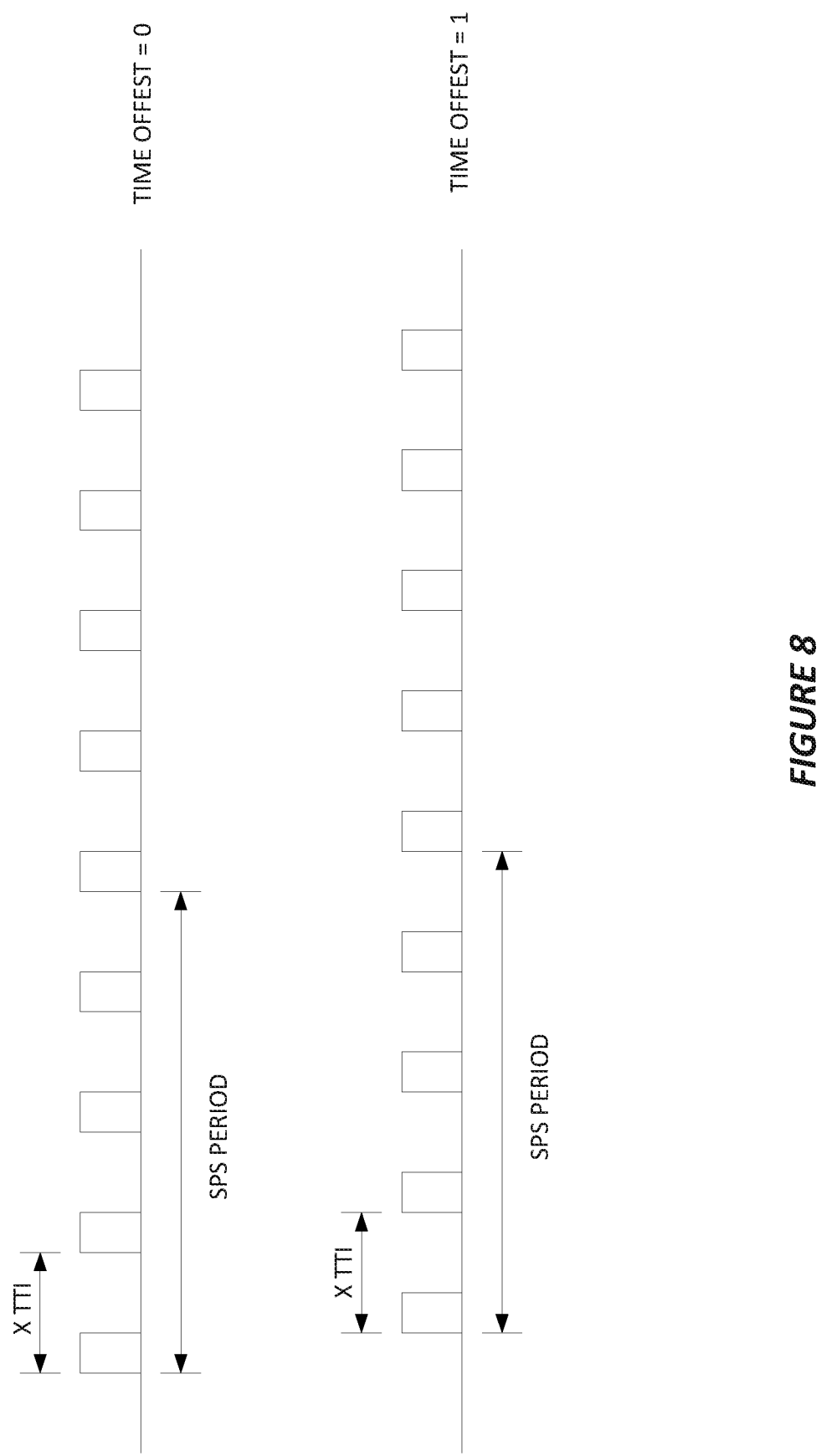
FIG. 8 illustrates over-provisioning of SPS resources wherein less than all of the available SPS resources are allocated.

In the scenario where less than all the SPS resources are allocated, the base station 300 can use an approach similar to Embodiment 2. The base station 300 starts with an initial SPS configuration and cycles through multiple SPS configurations in successive data transmissions to find the best SPS configuration. After each data transmission, the base station increments the offset for the SPS configuration by one transmission interval as shown in FIG. 8. FIG. 8 shows an example of two SPS configurations where SPS resources are allocated for every three transmission intervals. The base statin 300 can then detect the optimal alignment of the SPS configuration as described in Embodiment 2 by comparing the outcomes of each data transmission. A maximum number of data transmissions to find the optimal solution is X. This technique may be employed for both uplink and downlink transmissions.

Figure 9:
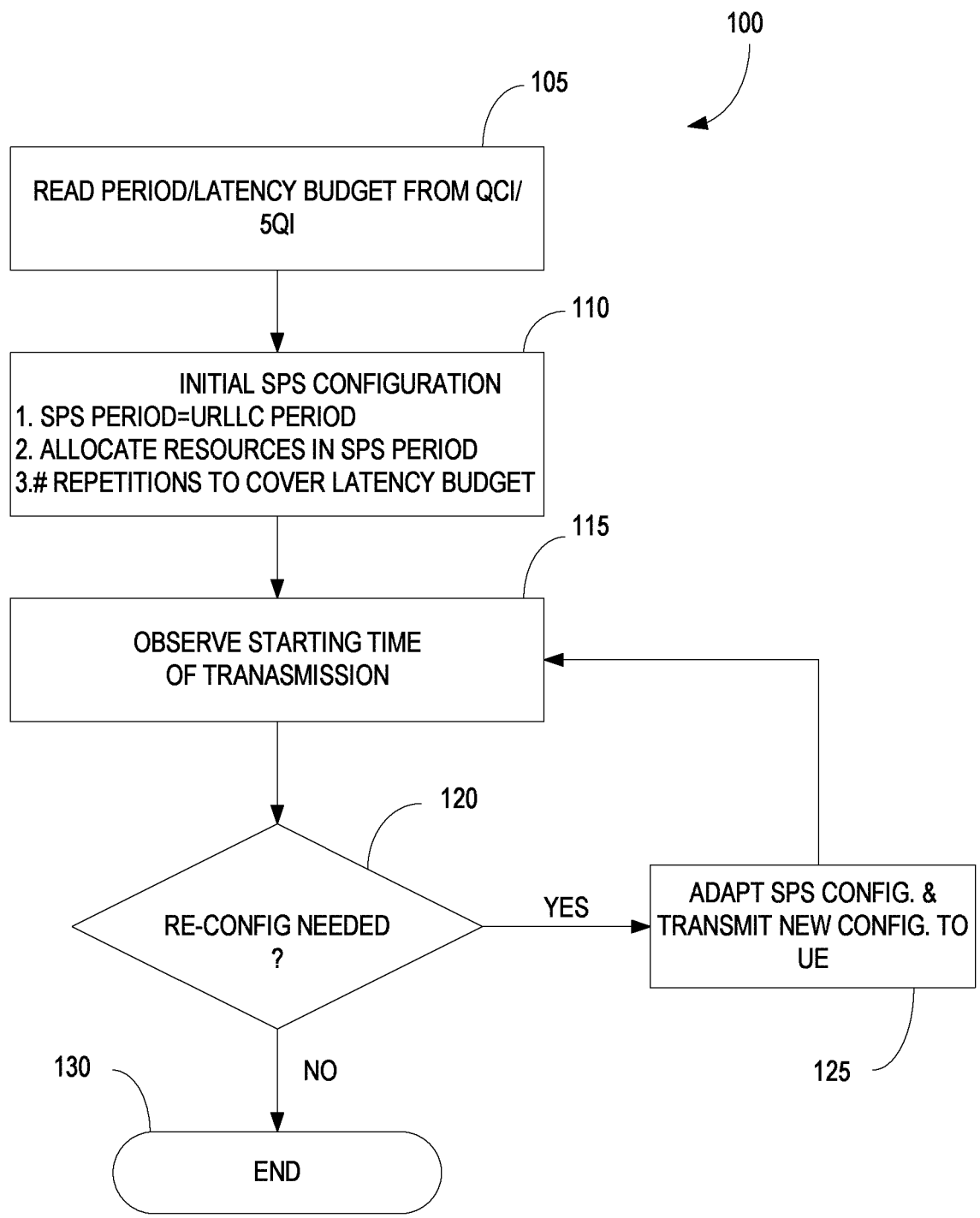
FIG. 9 illustrates a method implemented by the base station for determining the SPS configuration.

FIG. 9 illustrates an exemplary method 100 implemented by the base station 300 for synchronizing the SPS configuration with a periodic data transmission in one exemplary embodiment. The base station 300 obtains the periodicity and latency budget for the periodic data transmission from QCI/5QI (block 105). The base station 300 then determines an initial SPS configuration which includes the SPS period, the resource allocation, and the number of repetitions. In one embodiment, all SPS resources in the SPS period are allocated for the initial SPS configuration. In other embodiments, such as when the base station 300 knows an approximate packet arrival time, the base station 300 allocates less than all the SPS resources in the SPS period to the UE 400. The SPS period is set equal to the URLLC period and the number of repetitions is determined based on the latency budget (block 110). Once a data transmission has occurred, the base station 300 observes the starting time of the data transmission (block 115). The data transmission may occur on the UL or DL. Based on the starting time of the data transmission, the base station 300 determines whether reconfiguration is needed (block 120). If so, the base station 300 adapts the SPS configuration and transmits the new configuration to the UE 400 (block 125). Reconfiguration continues in this manner until the optimal solution is obtained, after which the process ends (block 130).

Figure 10:
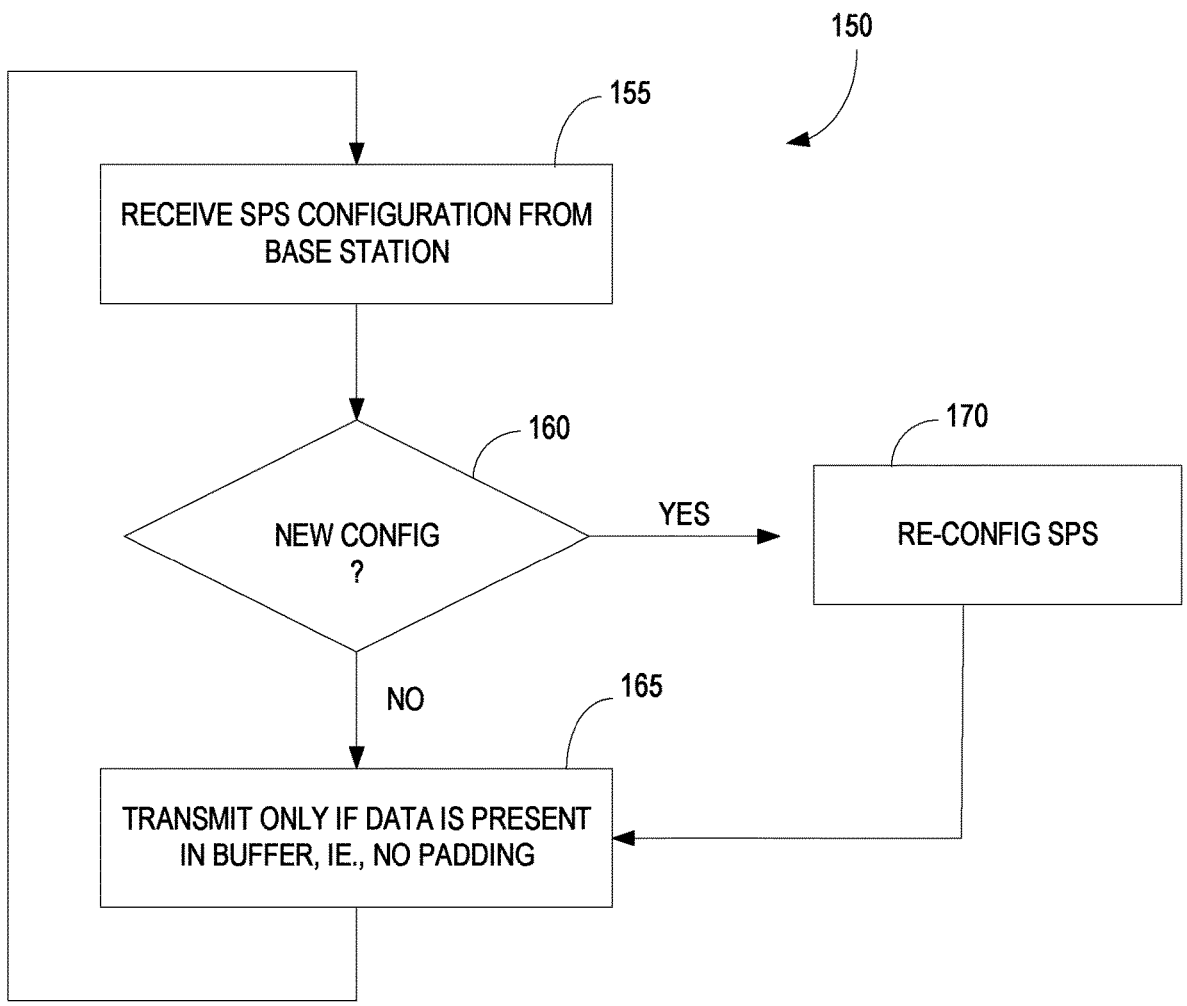
FIG. 10 illustrates a method implemented by the UE for configuring SPS.

FIG. 10 illustrates an exemplary method 150 implemented by a UE 400. The UE 400 receives an SPS configuration from the base station 300 (block 155). The UE 400 determines whether the SPS configuration is new (block 160). If not, the UE 400 continues using the current SPS configuration and transmits only if data is present in its buffer (block 165). If the SPS configuration received from the base station 300 is new, the UE 400 reconfigures SPS for the periodic data transmission (block 170). After reconfiguration, the UE 400 uses the new SPS configuration and transmits only if data is present in its buffer (block 165). This process continues until the periodic data transmission ends.

Figure 11:
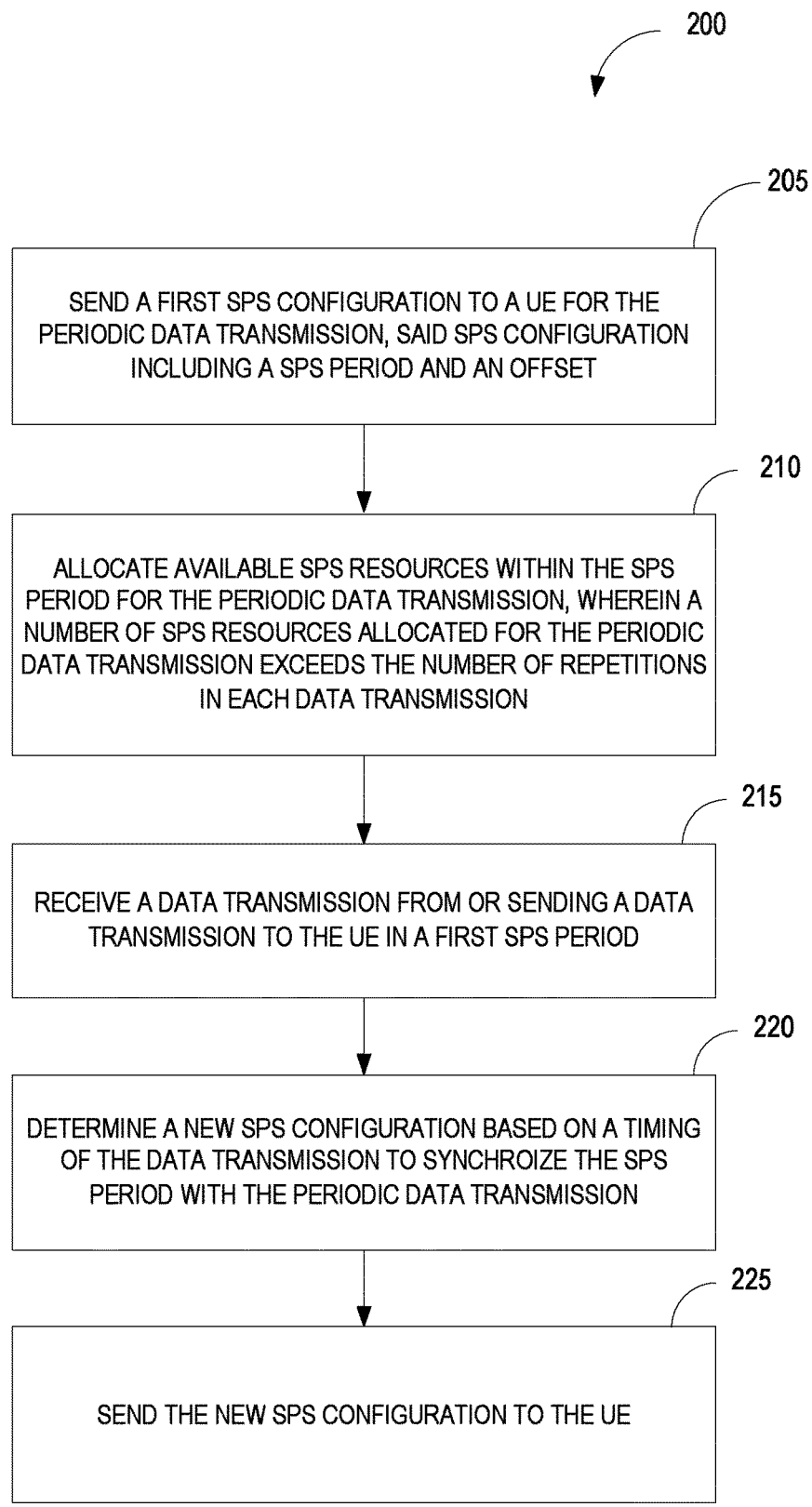
FIG. 11 illustrates a method implemented by the base station for configuring SPS for a periodic data transmission.

FIG. 11 illustrates an exemplary method 200 implemented by a base station 300 of synchronizing a periodic data transmission where each data transmission of the periodic data transmission comprises a predetermined number of repetitions. The base station 300 sends a first SPS configuration to a UE 400 for the periodic data transmission (block 205). The SPS configuration includes a SPS period and an offset. It is assumed that the SPS is not synchronized with the data transmission period. When the SPS period is not synchronized, the base station 300 allocates a number of SPS resources for the periodic data transmission exceeding the number of repetitions in each data transmission (block 210). That is, the base station 200 over-provisions the SPS resources for the unsynchronized data transmission. Subsequently, the base station 300 receives a data transmission from the UE 400 or sends a data transmission to the UE 400 in a first SPS period in accordance with the first SPS configuration (block 215). Based on timing of the data transmission, the base station 300 determines a new SPS configuration to synchronize the SPS period with the periodic data transmission (block 220) and sends the new SPS configuration to the UE 40 (block 225).

In some embodiments of the method 200, the periodic data transmission comprises an uplink transmission from the UE 400 to the base station 300. In other embodiments of the method 200, the periodic data transmission comprises a downlink transmission from the UE 400 to the base station 300.

In some embodiments of the method 200, the base station 300 determines the new SPS configuration by adjusting the offset compared to the first SPS configuration.

In some embodiments of the method 200, a periodic data transmission can begin at any time in the first SPS period. Where the starting time for the periodic data transmission is not known, the base station 300 determines the timing of the initial repetition of the data transmission and determines the new SPS configuration based on the timing of the initial repetition. For example, assume that the SPS period begins at time t and the data transmission begins at time t+5. The base station 300 adjusts the SPS configuration so that it begins at time t+5.

In other embodiments of the method 200, the periodic data transmission is constrained to begin at certain points in time in the SPS period. Where the starting time for the periodic data transmission is constrained to begin at certain points in time, the base station 300 can determine the new SPS configuration as follows. First, the base station 300 determines, based on the timing of the initial repetition of the data transmission, one or more candidate SPS configurations with different timing offsets. For each candidate SPS configuration, the base station 300 determines a data transmission time for the data transmission and then selects the candidate SPS configuration with the lowest data transmission time as the new SPS configuration. For example, if the initial repetition of the data transmission begins at time t+5, the base station 300 selects candidate SPS configurations with offsets equal to t+5, t+4, t+3, and t+2, determines a data transmission time for each SPS configuration, and selects the candidate SPS configuration with the lowest data transmission time as the new SPS configuration.

In some embodiments of the method 200, the base station 300 allocates all available SPS resources in the first SPS period for the data transmission. In other embodiments, the base station 300 allocates less that all the available SPS resources in the first SPS period for the periodic data transmission. For example, the base station 300 may allocate every nth SPS resource where n is an integer less than the total number of available SPS resources. In another example, the may allocate a subset of the available continuous resources within the SPS periods in the vicinity of a known or estimated data packet arrival time.

In one embodiment of the method 200 for periodic uplink data transmissions from the UE 400 to the base station 300, the base station 300 receives assistance information from the UE 400 indicating a data packet arrival time for the periodic data transmissions and allocates available SPS resources based on the assistance information. The data packet arrival time may be an exact time relative to an absolute time reference, or may be an approximate time.

In some embodiments of the method 200, the number of repetitions equals one. In some embodiments of the method 200, the base station 300 adjusts the resource allocation after achieving synchronization of the SPS period with the periodic data transmission. On one embodiment, the base station allocates a number of available SPS resources for the periodic data transmission equal to the number of repetitions after synchronizing the SPS period with the periodic data transmission.

In some embodiments of the method 200, the base station 30 detects a non-periodic data transmission from the UE during one of said SPS periods. Responsive to detecting the non-periodic data transmission, the base station 300 adjusts a resource allocation for the periodic data transmission.

In some embodiments of the method 200 wherein the periodic data transmission comprises a downlink transmission, the base station 300 sends padding data when there is no data in in its transit buffer. In some embodiments, the base statin 300 applies different cyclic shifts in reference signals for padding data and non-padding data in the periodic data transmission to enable detection of the periodic data transmission by the UE 400.

Figure 12:
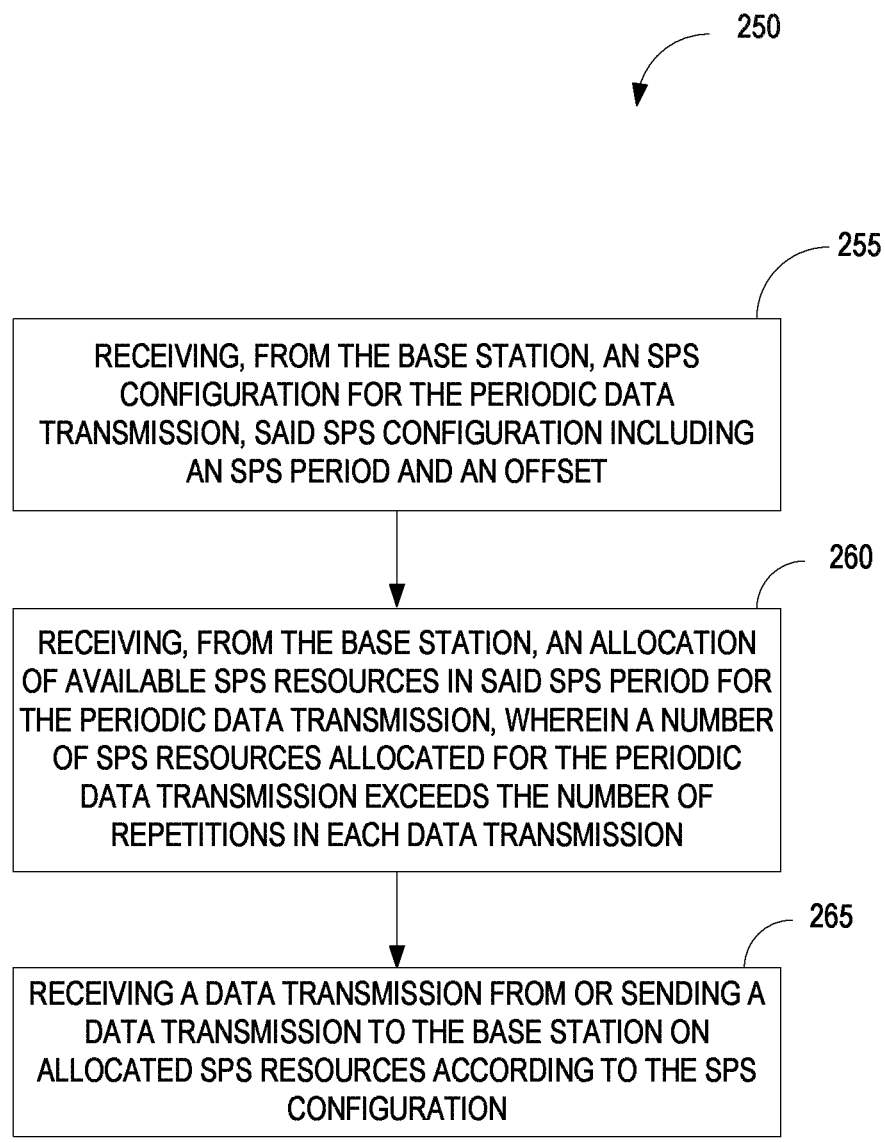
FIG. 12 illustrates a method implemented by the UE for configuring SPS for a periodic data transmission.

FIG. 12 is a flow chart of an example method 250 performed by the UE 400 according to one embodiment. The UE 400 receives, from the base station 300, an SPS configuration for the periodic data transmission (block 255). The SPS configuration includes an SPS period and an offset. The UE 400 receives, from the base station 300, an allocation of available SPS resources in said SPS period for the periodic data transmission (block 260). The number of SPS resources allocated for the periodic data transmission exceeds the number of repetitions in each data transmission. The UE 400 then receives data transmission from or sends a data transmission to the base station 300 on allocated SPS resources according to the SPS configuration (block 265).

In some embodiments of the method 250, the data transmission comprises a downlink transmission from the base station 300 and the UE 400 blindly detects the data transmission. In some embodiments, the UE 400 detects a cyclic shift of a reference signal in the data transmission and determines if the data transmission comprises padding data or non-padding data based on the cyclic shift.

In some embodiments of the method 250, the data transmission comprises an uplink transmission from the UE 400 to the base station 300 and UE 400 selects SPS resources for the data transmission based on a data packet arrival time.

In some embodiments of the method 250, the data transmission comprises an uplink transmission from the UE 400 to the base station 300 and the UE 400 sends assistance information to the base station indicating a data packet arrival time for the periodic data transmission. The data packet arrival time may be an exact time or an estimated time.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 13:
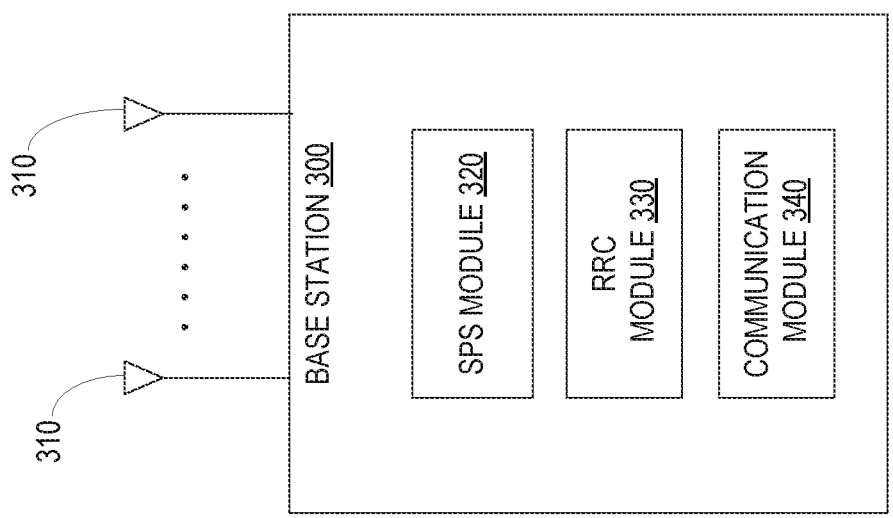
FIG. 13 is a block diagram illustrating the main functional components of a base station in a wireless communication network according to one embodiment.

FIG. 13 illustrates a base station 300 in accordance with one or more embodiments. The base station 300 comprises one or more antennas 310, a SPS module 320 for determining a SPS configuration for periodic data transmissions, a radio resource control (RRC) module 330 for allocating SPS resources for periodic data transmissions, and a communication module 340. The various modules 320, 330, and 340 can be implemented by hardware and/or by software code that is executed by a processor or processing circuit. The SPS module 320 determines the SPS configuration for a periodic data transmission and signals the SPS configuration to the UE 400. The RRC module 330 handles SPS resource allocation for the periodic data transmission. The communication module 310 transmits and/or receives the periodic data transmission using the SPS configuration. In one embodiment, the SPS module 320 determines a first SPS configuration and signals the first SPS configuration to the UE 400. The RRC module 330 allocates resources for the first SPS configuration. The amount of resources allocated for the first SPS configuration exceeds the number of repetitions in the periodic data transmission. The communication module 340 sends a periodic data transmission to or receives a data transmission from the UE 400. The SPS module then determines a new SPS configuration based on the timing of the data transmission and signals the new SPS configuration to the UE 400. The various modules 420, 430, and 440 can be implemented by hardware and/or by software code that is executed by a processor or processing circuit.

Figure 14:
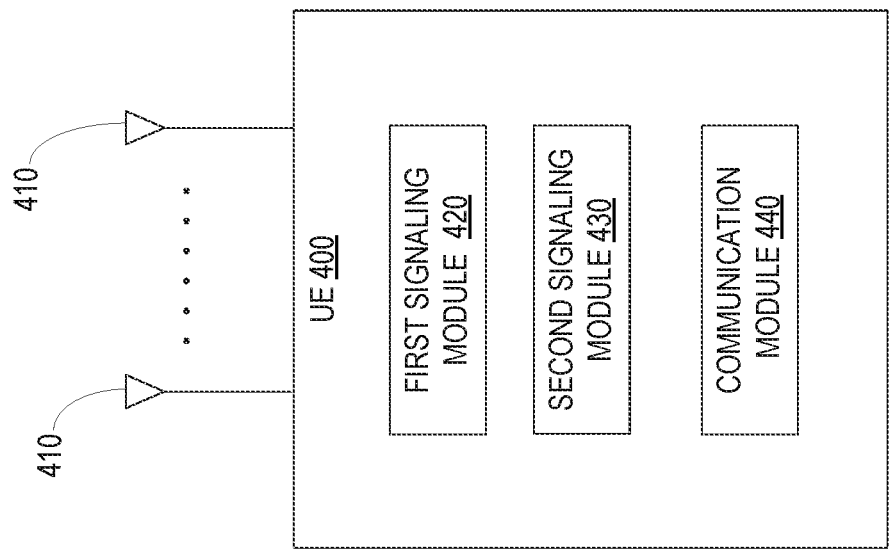
FIG. 14 is a block diagram illustrating the main functional components of a UE in a wireless communication network according to one embodiment.

FIG. 14 illustrates a UE 400 in accordance with one or more embodiments. The UE 400 comprises one or more antennas 410, a first signaling module 420 that receives a SPS configuration for periodic data transmissions from the base station 300, a second signaling module 430 that receives an allocation of available SPS resources in a SPS period for the periodic data transmission from the base station 300, and a communication module 440 for receiving a data transmission from or sending a data transmission to the base station on allocated SPS resources according to the SPS configuration.

Figure 15:
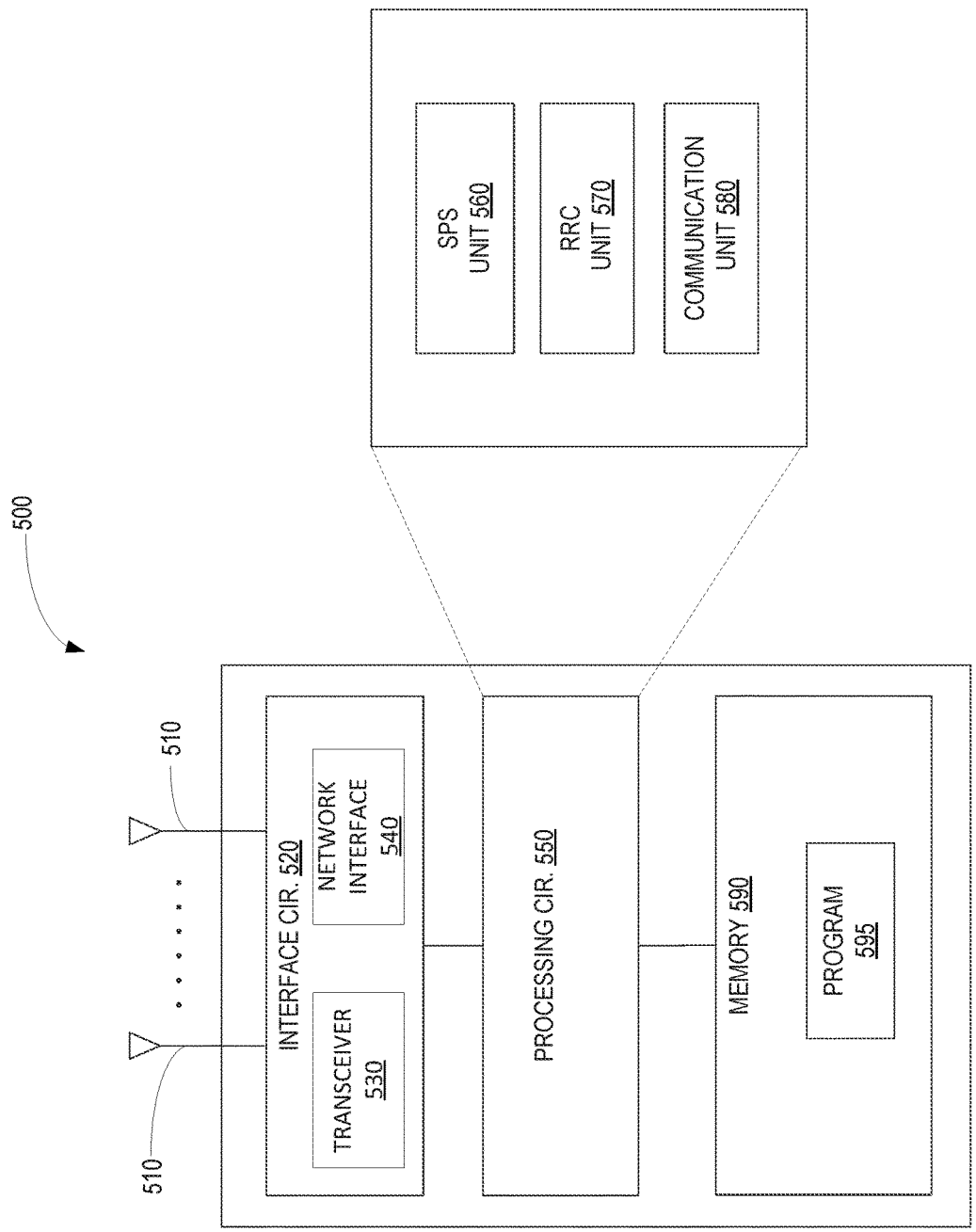
FIG. 15 is a block diagram illustrating the main functional components of base station according to another embodiment.

FIG. 15 illustrates a wireless terminal 500 according to one embodiment that may be configured to function as a base station 300 or UE 400 as herein described. The wireless terminal 500 comprises one or more antenna 510, an interface circuit 520, a processing circuit 550, and memory 590.

The interface circuit 520 is coupled to the antennas 510 and comprises the radio frequency (RF) circuitry needed for transmitting and receiving signals over a wireless communication channel. In one embodiment, the interlace circuit 620 comprises a transceiver 550 operating according to the LTE or NR standard for transmitting signals to and receiving signals from the base station 300. The interface circuit 520 further comprises a network interface 540 for communicating over backhaul and side haul channels with other network nodes in the communication network 10.

The processing circuit 550 processes the signals transmitted to or received by the wireless terminal 500. The processing circuit 550 may comprise one or more microprocessors, hardware, firmware, or a combination thereof. The processing circuit 550 includes a SPS unit 560 for determining a SPS configuration for periodic data transmissions, a RRC unit 570 for allocating SPS resources for periodic data transmissions and a communication unit 580. In one embodiment, the SPS unit 560, RRC unit 570 and communication unit 580 are implemented by a single microprocessor. In other embodiments, the SPS unit 560, RRC unit 570 and communication unit 580 are implemented using different microprocessors.

In one embodiment, the SPS unit 560 determines a first SPS configuration and signals the first SPS configuration to the UE 400. The RRC unit 570 allocates resources for the first SPS configuration. The amount of resources allocated for the first SPS configuration exceeds the number of repetitions in the periodic data transmission. The communication unit 580 sends a data transmission to or receives a data transmission from the UE 400. The SPS unit 560 then determines a new SPS configuration based on the timing of the data transmission and signals the new SPS configuration to the UE 400.

Memory 590 comprises both volatile and non-volatile memory for storing computer program code and data needed by the processing circuit 550 for operation. Memory 590 may comprise any tangible, non-transitory computer-readable storage medium for storing data including electronic, magnetic, optical, electromagnetic, or semiconductor data storage. Memory 590 stores a computer program 595 comprising executable instructions that configure the processing circuit 550 to implement methods 100 or 140 according to FIGS. 9 and 11 as described herein. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, computer program 595 for configuring the processing circuit 550 as herein described may be stored in a removable memory, such as a portable compact disc, portable digital video disc, or other removable media. The computer program 595 may also be embodied in a carrier such as an electronic signal, optical signal, radio signal, or computer readable storage medium.

Figure 16:
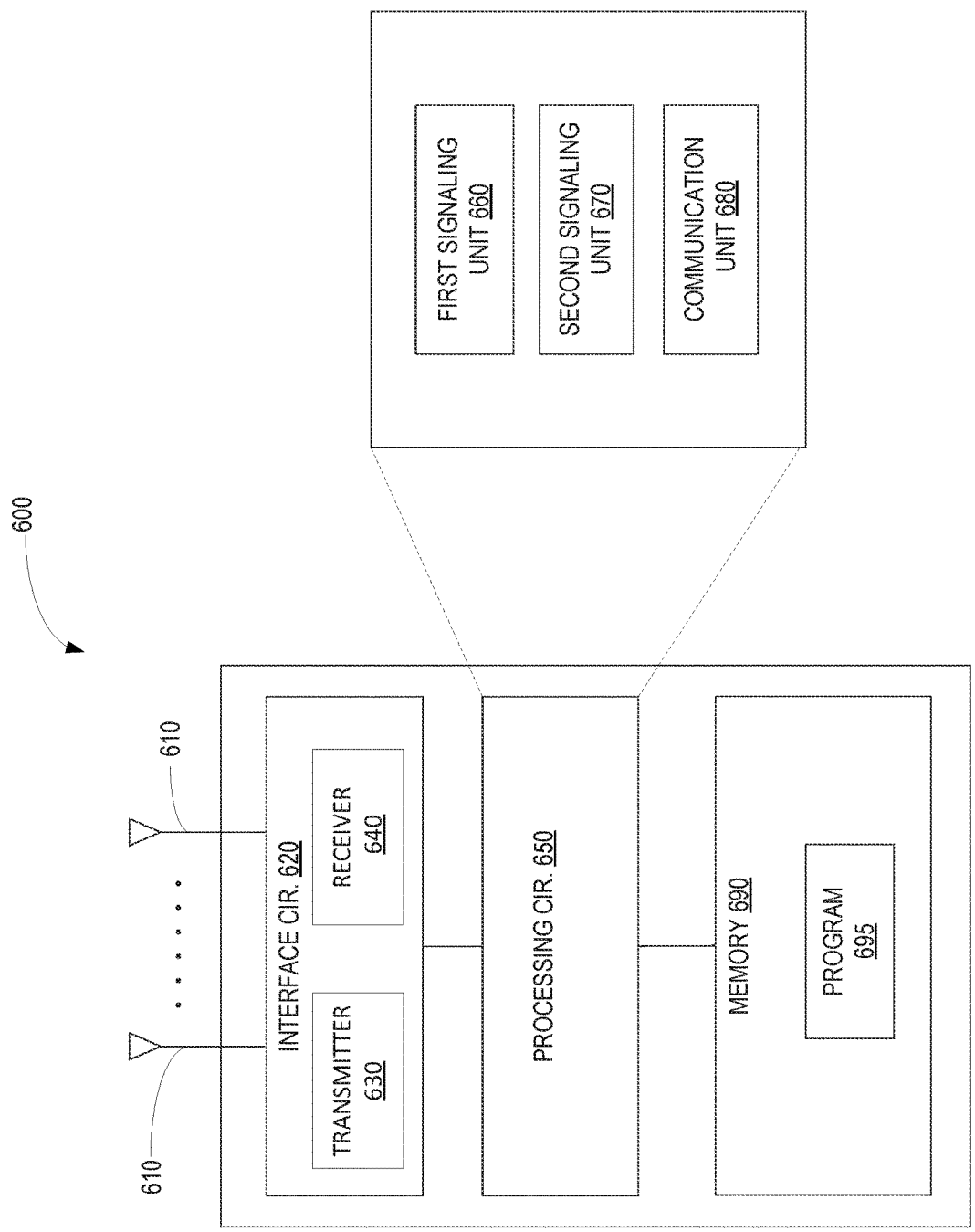
FIG. 16 is a block diagram illustrating the main functional components of a UE according to another embodiment.

FIG. 16 illustrates a UE 600 according to one embodiment. The UE 600 comprises one or more antennas 610, an interface circuit 620, a processing circuit 650, and memory 690.

The interface circuit 620 is coupled to the antennas 610 and comprises the radio frequency (RF) circuitry needed for transmitting and receiving signals over a wireless communication channel. In one embodiment, the interface circuit 620 comprises a transmitter 630 and receiver 640 operating according to the LTE or NR standard for transmitting signals to and receiving signals from the base station 300.

The processing circuit 650 processes the signals transmitted to or received by the wireless terminal 600. The processing circuit 650 may be implemented by one or more microprocessors, hardware, firmware, or a combination thereof. The processing circuit 650 includes a first signaling unit 660 for receiving an SPS configuration from a base station 300, a second signaling unit 670 for receiving an SPS resource allocation from base station 300, and a communication unit 680 for sending periodic data transmissions to or receiving periodic data transmissions from the base station 300. In one embodiment, the first signaling unit 660, second signaling unit 670, and communication unit 680 are implemented by a single microprocessor. In other embodiments, the first signaling unit 660, second signaling unit 670, and communication unit 680 are implemented using different microprocessors.

Memory 690 comprises both volatile and non-volatile memory for storing computer program code and data needed by the processing circuit 650 for operation. Memory 690 may comprise any tangible, non-transitory computer-readable storage medium for storing data including electronic, magnetic, optical, electromagnetic, or semiconductor data storage. Memory 690 stores a computer program 695 comprising executable instructions that configure the processing circuit 650 to implement methods 100 or 140 according to FIG. 10 and as described herein. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, computer program 695 for configuring the processing circuit 650 as herein described may be stored in a removable memory, such as a portable compact disc, portable digital video disc, or other removable media. The computer program 695 may also be embodied in a carrier such as an electronic signal, optical signal, radio signal, or computer readable storage medium.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Using the techniques herein described, the periodicity and starting time of URLLC traffic are aligned with the allocated SPS resources so that the latency to wait for an UL/DL transmission is minimized. Two approaches, one without 3GPP standardization impact and one with 3GPP standardization impacts, are presented.

Additional Embodiments

Figure 17:
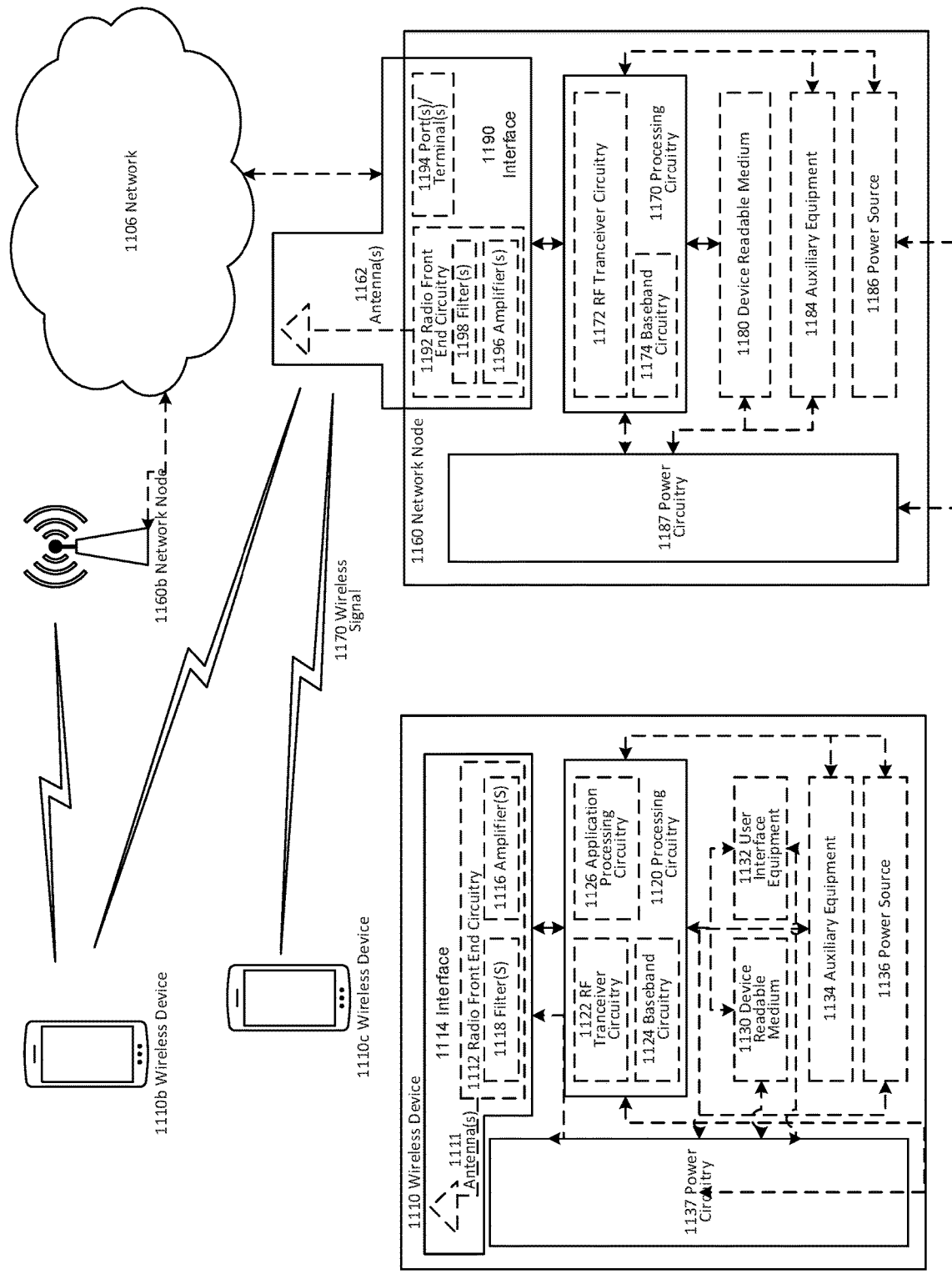
FIG. 17 is a schematic block diagram illustrating an example wireless network, according to particular embodiments of the present disclosure.

Although the subject matter described herein may be implemented in any appropriate type of system using any suitable components, the embodiments disclosed herein are described in relation to a wireless network, such as the example wireless network illustrated in FIG. 17. For simplicity, the wireless network of FIG. 17 only depicts network 1106, network nodes 1160 and 1160*b*, and WDs 1110, 1110*b*, and 1110*c*. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 17, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 17 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 17 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band Internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RE transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 18:
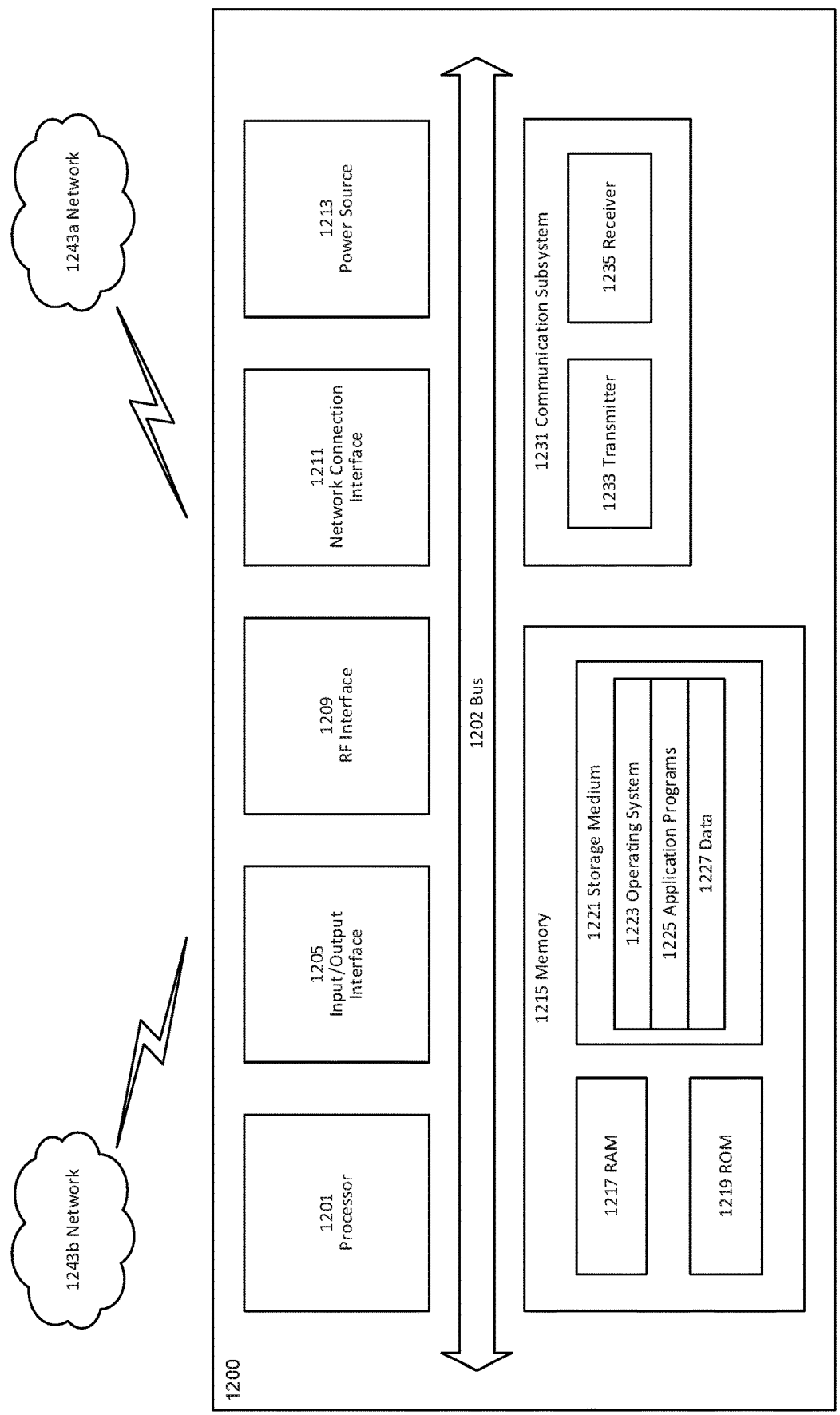
FIG. 18 is a schematic block diagram illustrating an example of a user equipment, according to particular embodiments of the present disclosure.

FIG. 18 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 18, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 18 is a UE, the components discussed herein are equally applicable to a WD, and vice-versa.

In FIG. 18, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 18, or only a subset of the components. The level of integration between the components may vary from one UE to another UE. Further, certain UEs may contain multiple instances of a component, such as multiple processors, memories, transceivers, transmitters, receivers, etc.

In FIG. 18, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 18, RF interface 1209 may be configured to provide a communication interface to RF components such as a transmitter, a receiver, and an antenna. Network connection interface 1211 may be configured to provide a communication interface to network 1243*a*. Network 1243*a* may encompass wired and/or wireless networks such as a local-area network (LAN), a wide-area network (WAN), a computer network, a wireless network, a telecommunications network, another like network or any combination thereof. For example, network 1243*a* may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 18, processing circuitry 1201 may be configured to communicate with network 1243*b* using communication subsystem 1231. Network 1243*a* and network 1243*b* may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 19:
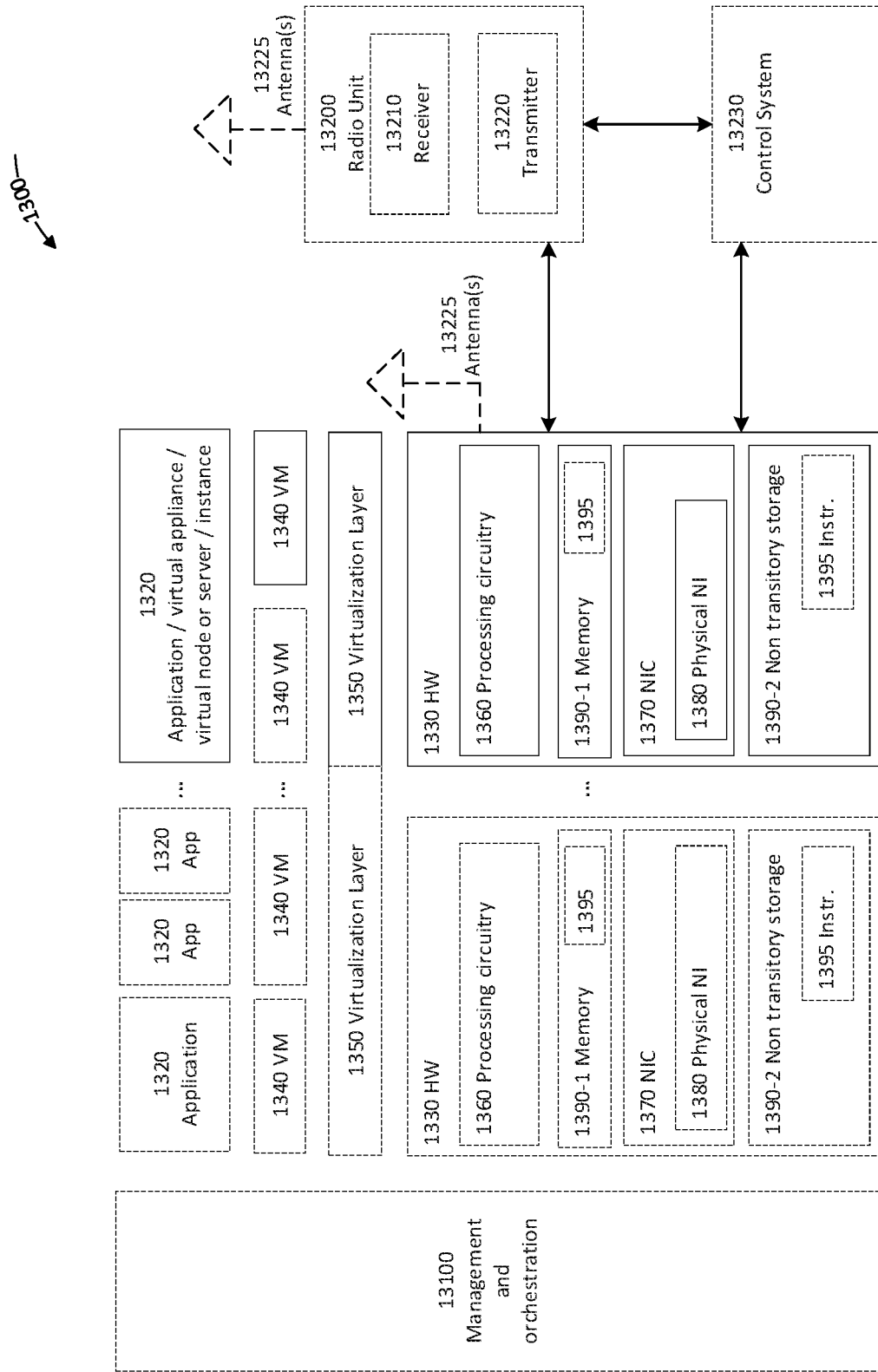
FIG. 19 is a schematic block diagram illustrating an example of a virtualization environment, according to particular embodiments of the present disclosure.

FIG. 19 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 19, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 19.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signaling can be effected with the use of control system 13230 which may alternatively be used for communication between the hardware nodes 1330 and radio units 13200.

Figure 20:
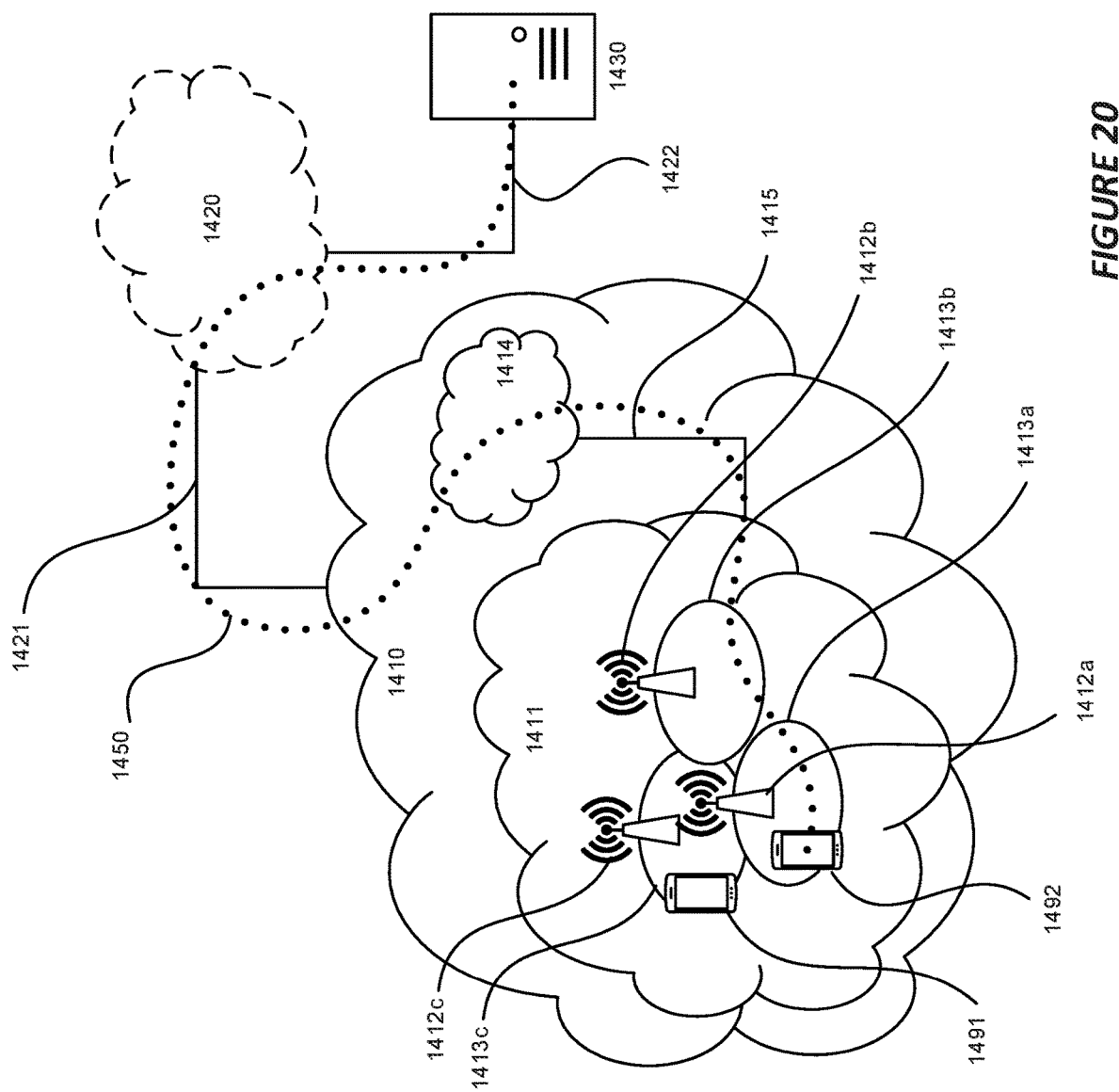
FIG. 20 is a schematic illustrating an example telecommunication network, according to particular embodiments of the present disclosure.

FIG. 20 illustrates a telecommunication network connected via an intermediate network to a host computer in accordance with some embodiments. In particular, with reference to FIG. 20, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 20 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 21:
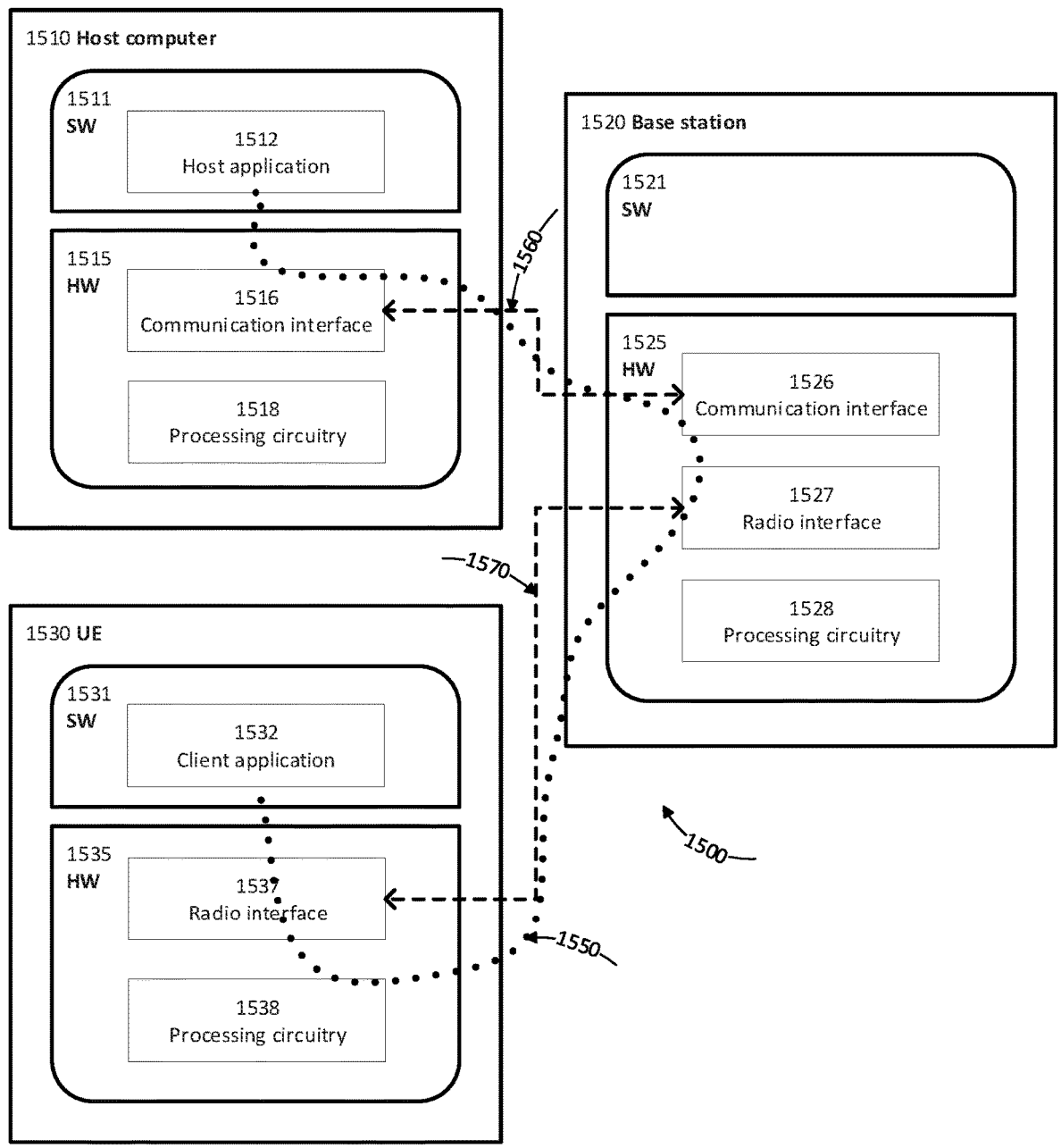
FIG. 21 is a schematic block diagram illustrating an example communication system, according to particular embodiments of the present disclosure.

Example implementations, in accordance with an embodiment, of the UE, base station and host computer discussed in the preceding paragraphs will now be described with reference to FIG. 21. FIG. 21 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 21) served by base station 1520. Communication interface 1526 may be configured to facilitate connection 1560 to host computer 1510. Connection 1560 may be direct or it may pass through a core network (not shown in FIG. 21) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 21 may be similar or identical to host computer 1430, one of base stations 1412*a*, 1412*b*, 1412*c* and one of UEs 1491, 1492 of FIG. 20, respectively. This is to say, the inner workings of these entities may be as shown in FIG. 21 and independently, the surrounding network topology may be that of FIG. 20.

In FIG. 21, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the latency of data transmissions and thereby provide benefits such as reduced waiting time, particularly for machine control applications.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 22:
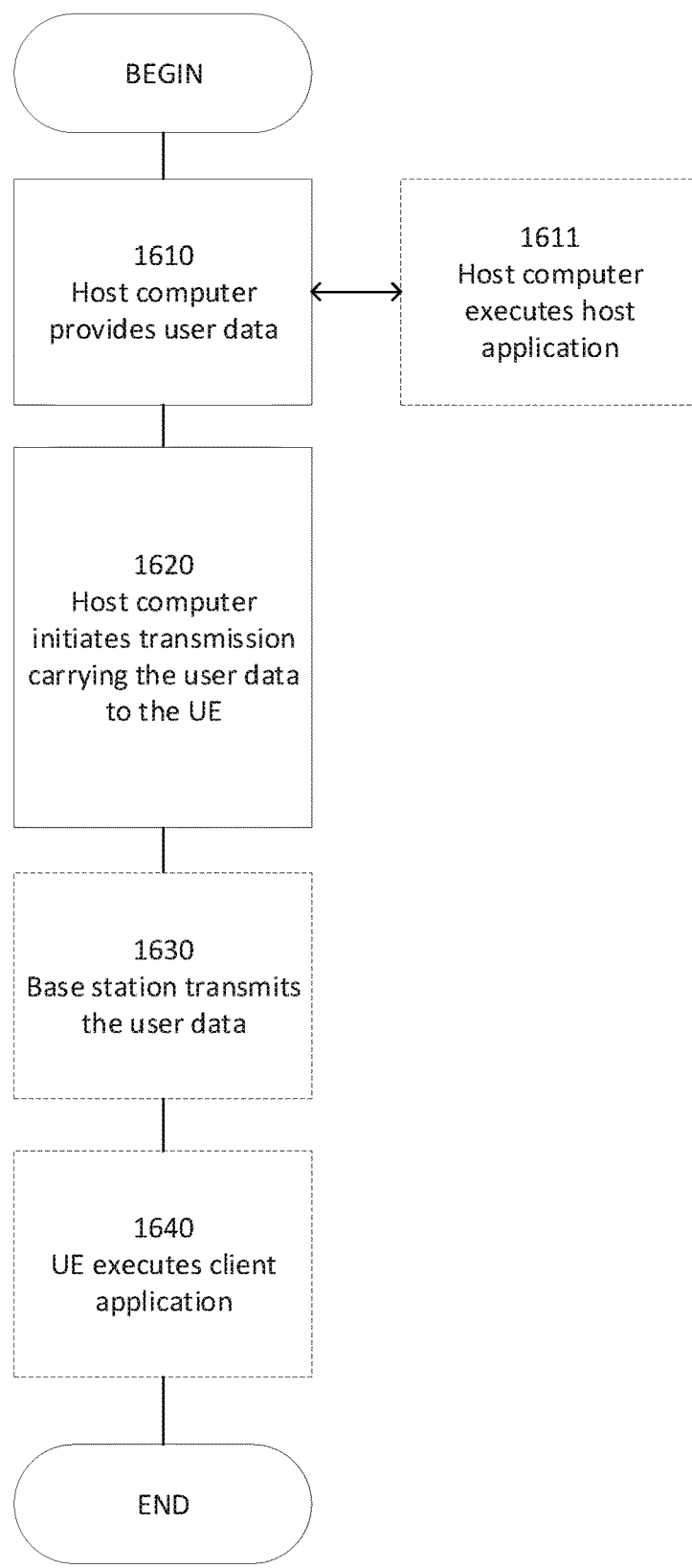
FIGS. 22-25 are flow diagrams, each of which illustrates an example method implemented in a communication system, according to particular embodiments of the present disclosure.

FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 23:
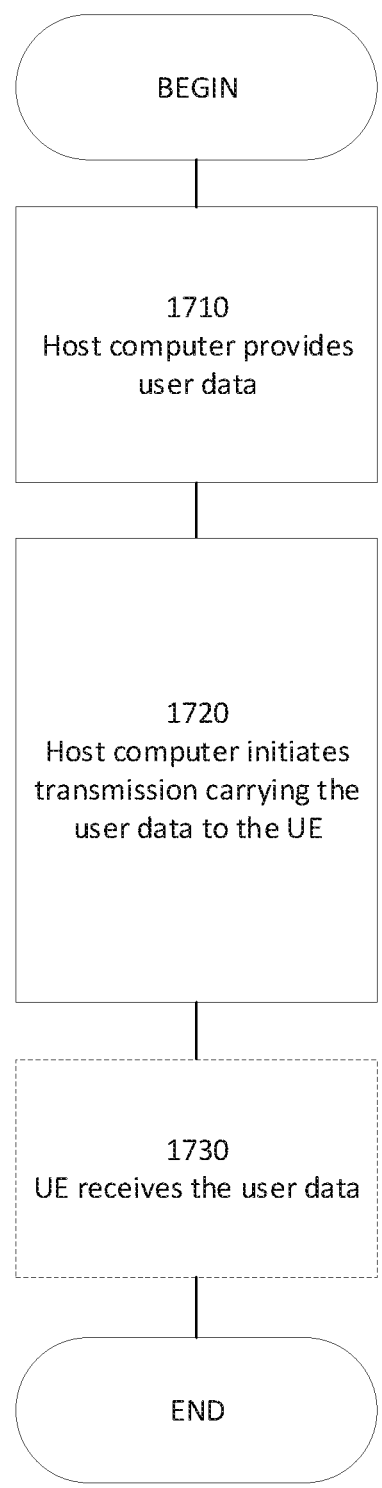

FIG. 23 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 23 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 24:
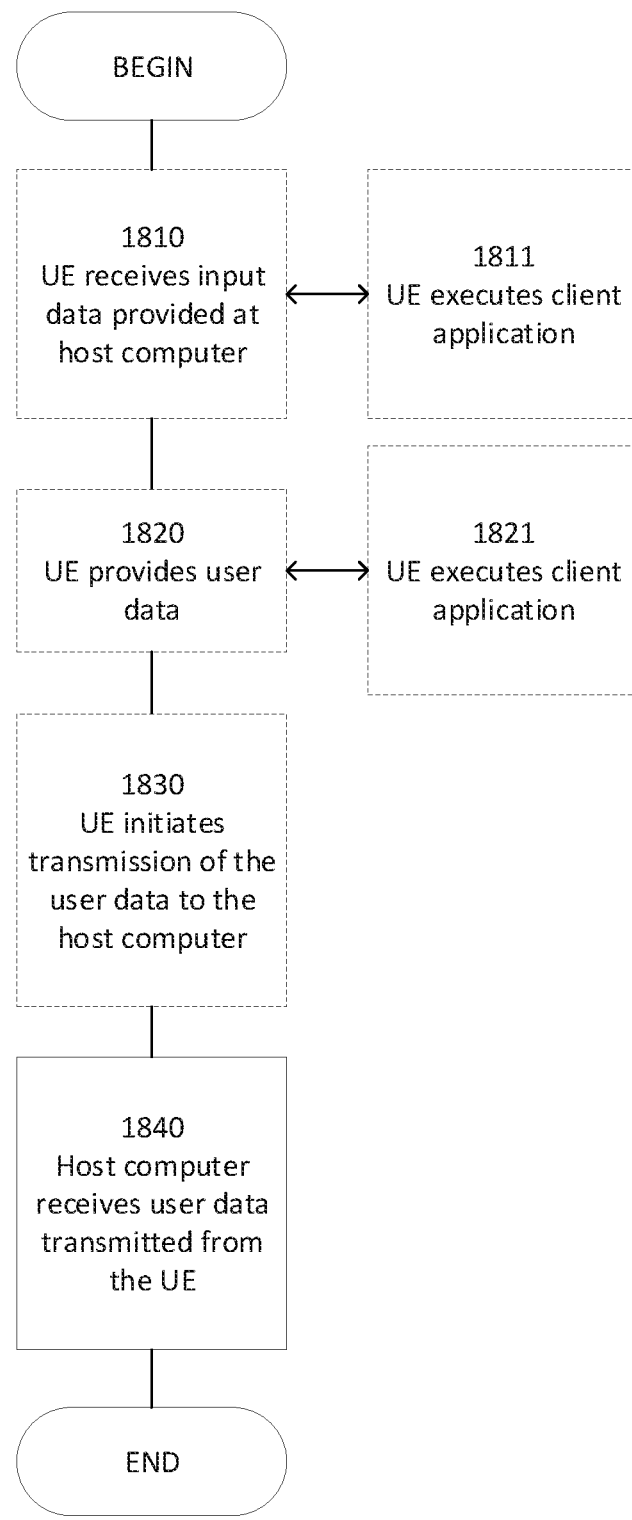

FIG. 24 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 24 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 25:
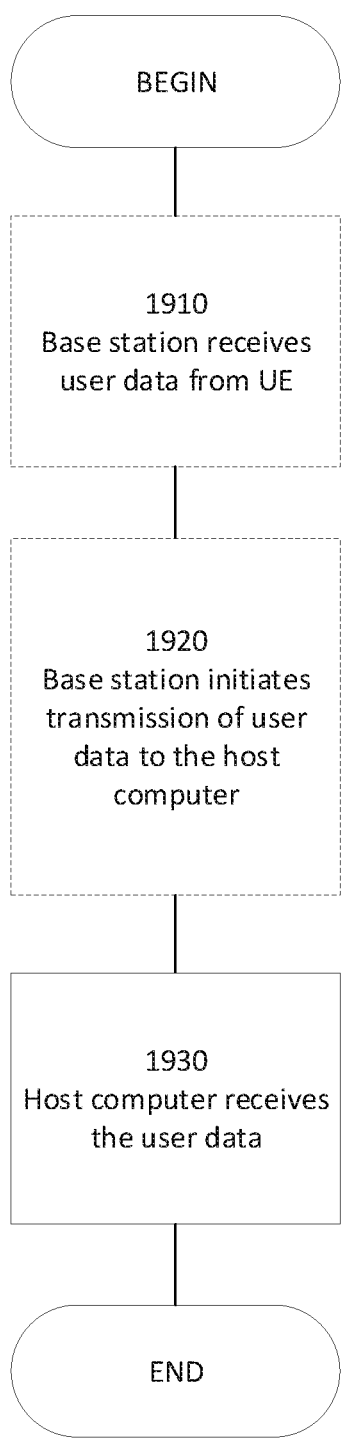

FIG. 25 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 25 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

Embodiments of the present disclosure may additionally or alternatively include any compatible combination of features described herein. Indeed, the present invention may be carried out in ways other than those specifically set forth herein without departing from essential characteristics of the invention. The present embodiments are to be considered in all respects as illustrative and not restrictive, and all changes coming within the meaning and equivalency range of the appended claims are intended to be embraced therein. For example, although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

What is claimed is:

1. A method, implemented by base station in a wireless communication network, of synchronizing a periodic data transmission, each data transmission of the periodic data transmission comprising a predetermined number of repetitions, the method comprising:

sending a first Semi-Persistent Scheduling (SPS) configuration to a user equipment for the periodic data transmission, the SPS configuration including a SPS period and an offset;

allocating available SPS resources within the SPS period for the periodic data transmission, wherein a number of SPS resources allocated for the periodic data transmission exceeds the number of repetitions in each data transmission;

receiving a data transmission from, or sending a data transmission to, the user equipment in a first SPS period;

determining a new SPS configuration based on a timing of the data transmission to synchronize the SPS period with the periodic data transmission; and sending the new SPS configuration to the user equipment.

2. The method of claim 1, wherein the determining the new SPS configuration comprises:
   determining a timing of an initial repetition of the data transmission relative to a start of the SPS period; and
   determining the new SPS configuration based on the timing of the initial repetition of the data transmission.

3. The method of claim 2, wherein the determining the new SPS configuration comprises:
   determining, based on the timing of the initial repetition of the data transmission, one or more candidate SPS configurations with different timing offsets;
   for each candidate SPS configuration, determining a data transmission time for the data transmission; and
   selecting the candidate SPS configuration with the lowest data transmission time as the new SPS configuration.

4. The method of claim 1, wherein the determining the new SPS configuration comprises adjusting the offset compared to the first SPS configuration.

5. The method of claim 1, wherein the allocating available SPS resources comprises allocating all available SPS resources within the SPS period to the user equipment for the periodic data transmission.

6. The method of claim 1, wherein the allocating available SPS resources comprises allocating less than all available SPS resources within the SPS period to the user equipment for the periodic data transmission.

7. The method of claim 1, wherein the number of repetitions equals one.

8. The method of claim 1, further comprising adjusting the allocation of SPS resources for the periodic data transmission after determining the new SPS configuration.

9. The method of claim 8, wherein the adjusting the allocation of SPS resources for the periodic data transmission comprises allocating a number of available SPS resources for the periodic data transmission equal to the number of repetitions.

10. The method of claim 1, further comprising:
    detecting a non-periodic data transmission from the user equipment during one of the SPS periods; and
    responsive to detecting the non-periodic data transmission, adjusting a resource allocation for the periodic data transmission.

11. The method of claim 1, wherein the periodic data transmission comprises an uplink transmission from the user equipment to the base station.

12. The method of claim 11:
    wherein the allocating available SPS resources comprises allocating less than all available SPS resources within the SPS period to the user equipment for the periodic data transmission; and
    wherein the allocating less than all available SPS resources within the SPS period to the user equipment for the periodic data transmission comprises:
        obtaining assistance information from the user equipment indicating a data packet arrival time for the periodic data transmission; and
        allocating available SPS resources within the SPS period based on the assistance information.

13. The method of claim 1, wherein the data transmission comprises a downlink transmission from the base station to the user equipment.

14. The method of claim 13, wherein the data transmission comprises padding data.

15. The method of claim 13, further comprising applying different cyclic shifts in reference signals for padding data and non-padding data in the periodic data transmission.

16. A method, implemented by a user equipment in a wireless communication network, of synchronizing a periodic downlink transmission between the user equipment and a base station, the method comprising:
    receiving, from the base station, a Semi-Persistent Scheduling (SPS) configuration for the periodic downlink transmission, the SPS configuration including an SPS period and an offset;
    receiving, from the base station, an allocation of available SPS resources in the SPS period for the periodic downlink transmission, wherein a number of SPS resources allocated for the periodic downlink transmission exceeds the number of repetitions in each downlink transmission;
    blindly detecting and receiving a downlink transmission from the base station on allocated SPS resources according to the SPS configuration;
    detecting a cyclic shift of a reference signal in the downlink transmission; and
    determining, based on the cyclic shift, if the downlink transmission comprises padding data or non-padding data.

17. A base station in a wireless communication network configured to synchronize a periodic data transmission, each data transmission of the periodic data transmission comprising a predetermined number of repetitions, the base station comprising:
    interface circuitry; and
    processing circuitry operatively connected to the interface circuitry and configured to:
        send a first Semi-Persistent Scheduling (SPS) configuration to a user equipment for the periodic data transmission, the SPS configuration including a SPS period and an offset;
        allocate available SPS resources within the SPS period for the periodic data transmission, wherein a number of SPS resources allocated for the periodic data transmission exceeds the number of repetitions;
        receive a data transmission from, or sending a data transmission to, the user equipment;
        determine a new SPS configuration based on a timing of the data transmission to synchronize the SPS period with the periodic data transmission; and
        send the new SPS configuration to the user equipment.

18. A user equipment in a wireless communication network configured to receive a periodic downlink transmission from a base station, the user equipment comprising:
    interface circuitry; and
    processing circuitry operatively connected to the interface circuitry and configured to:
        receive, from the base station, a Semi-Persistent Scheduling (SPS) configuration for the periodic downlink transmission, the SPS configuration including an SPS period and an offset;
        receive, from the base station, an allocation of available SPS resources in the SPS period for the periodic downlink transmission, wherein a number of SPS resources allocated for the periodic downlink transmission exceeds the number of repetitions in each downlink transmission; and
        blindly detect and receive a downlink transmission from the base station on allocated SPS resources according to the SPS configuration;

detect a cyclic shift of a reference signal in the downlink transmission; and determine, based on the cyclic shift, if the downlink transmission comprises padding data or non-padding data.

\* \* \* \* \*

UNITED STATES PATENT AND TRADEMARK OFFICE
CERTIFICATE OF CORRECTION

PATENT NO. : 11,109,329 B2
APPLICATION NO. : 16/323310
DATED : August 31, 2021
INVENTOR(S) : Zou et al.

It is certified that error appears in the above-identified patent and that said Letters Patent is hereby corrected as shown below:

In the Specification

In Column 14, Line 30, delete "interlace" and insert -- interface --, therefor.

In Column 23, Line 15, delete "RE" and insert -- RF --, therefor.

Signed and Sealed this
Seventeenth Day of May, 2022

Katherine Kelly Vidal
*Director of the United States Patent and Trademark Office*